United States Patent
Kim et al.

(10) Patent No.: US 12,144,089 B2
(45) Date of Patent: Nov. 12, 2024

(54) INDUCTION HEATING TYPE COOKTOP WITH REDUCED THERMAL DEFORMATION OF THIN FILM

(71) Applicant: LG Electronics Inc., Seoul (KR)

(72) Inventors: Seongjun Kim, Seoul (KR); Wontae Kim, Seoul (KR); Seonghoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/197,446

(22) Filed: May 15, 2023

(65) Prior Publication Data
US 2023/0284350 A1 Sep. 7, 2023

Related U.S. Application Data

(63) Continuation of application No. 16/849,558, filed on Apr. 15, 2020, now Pat. No. 11,678,411.

(30) Foreign Application Priority Data

Dec. 18, 2019 (KR) ........................ 10-2019-0169894

(51) Int. Cl.
*H05B 6/12* (2006.01)
*C03C 17/36* (2006.01)
(Continued)

(52) U.S. Cl.
CPC ....... *H05B 6/1272* (2013.01); *C03C 17/3655* (2013.01); *H05B 3/74* (2013.01); *H05B 6/062* (2013.01); *H05B 6/1254* (2013.01)

(58) Field of Classification Search
CPC ........ H05B 1/0266; H05B 3/74; H05B 6/062; H05B 6/12–1236; H05B 6/1272;
(Continued)

(56) References Cited

U.S. PATENT DOCUMENTS

| 6,633,023 B2 | 10/2003 | Comee et al. |
| 6,770,857 B2 | 8/2004 | Hirota et al. |

(Continued)

FOREIGN PATENT DOCUMENTS

| DE | 10127051 | 12/2002 |
| EP | 1487239 | 12/2004 |

(Continued)

OTHER PUBLICATIONS

Extended European Search Report in European Appln. No. 20179985.5, dated Nov. 13, 2020, 10 pages.
(Continued)

*Primary Examiner* — Hung D Nguyen
(74) *Attorney, Agent, or Firm* — Fish & Richardson P.C.

(57) ABSTRACT

An induction heating type cooktop includes a cover plate that is coupled to a top of a case and that includes an upper plate configured to seat an object to be heated, a working coil disposed inside the case and configured to heat the object, an insulator disposed between a bottom surface of the upper plate and the working coil, and a thin film that is disposed on at least one of a top surface of the upper plate or the bottom surface of the upper plate and that includes a plurality of sub-films that are arranged about a central portion of the thin film. An outer boundary of one of the plurality of sub-films is positioned radially outward of an outer boundary of another of the plurality of sub-films relative to the central portion of the thin film.

20 Claims, 22 Drawing Sheets

(51) Int. Cl.
*H05B 3/74* (2006.01)
*H05B 6/06* (2006.01)

(58) Field of Classification Search
CPC .. H05B 6/1245–1254; H05B 6/36–365; C03C 17/3655
See application file for complete search history.

(56) References Cited

U.S. PATENT DOCUMENTS

| | | | |
|---|---|---|---|
| 7,081,603 | B2 | 7/2006 | Hoh et al. |
| 2012/0125314 | A1* | 5/2012 | Alonso Esteban ..... C03C 17/36 126/211 |
| 2012/0138596 | A1 | 6/2012 | Esteban et al. |
| 2013/0199027 | A1 | 8/2013 | Singh et al. |
| 2019/0223263 | A1 | 7/2019 | Park et al. |

FOREIGN PATENT DOCUMENTS

| | | |
|---|---|---|
| EP | 1536669 | 6/2005 |
| EP | 3270660 | 1/2018 |
| EP | 3618569 | 3/2020 |
| JP | H11-151172 A | 6/1999 |
| JP | 3496558 | 2/2004 |
| JP | 2005-203212 | 7/2005 |
| JP | 2008-311058 | 12/2008 |
| JP | 2013-206540 | 10/2013 |
| JP | 5630495 | 11/2014 |
| JP | 2015-226615 | 12/2015 |
| KR | 10-2018-0066642 | 6/2018 |
| WO | WO 2018/189209 | 10/2018 |

OTHER PUBLICATIONS

PCT International Search Report in International Application No. PCT/KR2020/005370, mailed on Sep. 1, 2020, 3 pages.
Office Action in Korean Appln. No. 10-2019-0169894, mailed on Jul. 11, 2024, 11 pages (with English translation).

* cited by examiner

INDUCTION HEATING TYPE COOKTOP WITH REDUCED THERMAL DEFORMATION OF THIN FILM

CROSS-REFERENCE TO RELATED APPLICATION

This application is a continuation of U.S. application Ser. No. 16/849,558, filed on Apr. 15, 2020, which claims the benefit of Korean Patent Application No. 10-2019-0169894, filed on Dec. 18, 2019, the disclosures of which are incorporated herein in their entirety by reference.

TECHNICAL FILED

The present disclosure relates to an induction heating type cooktop including a thin film and, more specifically, to reduction of thermal deformation of a thin film in an induction heating type cooktop.

BACKGROUND

Various types of cookware are used to cook food at home or at restaurants. For example, gas ranges may use gas as fuel to heat food. In some cases, cooking devices may heat a target heating object such as a pot and a cooking vessel using electricity rather than gas.

Methods for heating a target heating object using electricity may be divided into a resistance heating method and an induction heating method. In the electric resistance heating method, a target heating object may be heated by heat that is generated when a current flows in a metal resistance wire or a non-metallic heating element such as Silicon Carbide (SIC) and transferred to the target heating object (e.g., a cooking vessel) through heat dissipation or heat transfer. In the induction heating method, a target heating object may be heated by an eddy current generated in the target heating object made of a metal material using an electrical field that is generated around a coil when a high frequency power having a predetermined magnitude is applied to the coil.

The induction heating method may be applied to cooktops.

In some cases, a cooktop using an induction heating method may only heat an object made of a magnetic material. That is, when an object made of a nonmagnetic material (for example, heat-resistant glass, porcelain, etc.) is disposed on the cooktop, the cooktop may not heat the nonmagnetic material object.

In some cases, an induction heating device may include a heating plate disposed between a cooktop and a nonmagnetic object to heat the object. Referring to Japanese Patent Application Laid-Open Publication No. 5630495 (Oct. 17, 2014), a method of implementing induction heating by adding a heating plate is disclosed. However, the aforementioned method has problems that heating efficiency of the heating plate may be low, and a cooking time required to heat ingredients contained in the target heating object may be increased.

In some cases, a hybrid cooktop may heat a nonmagnetic object through a radiant heater using an electric resistance heating method, where a magnetic object is heated through a working coil by induction. In some cases, an induction heating method is applied. Referring to Japanese Patent Application Laid-Open Publication No. 2008-311058 (Dec. 25, 2008), a configuration of the hybrid cooktop is disclosed. However, the aforementioned method has problems that output of the radiant heater may be low, and a heating efficiency may be low. A user may feel inconvenience in considering a material of a target heating object when placing the target heating object in the heating area.

In some cases, an all metal cooktop may heat a metal object (e.g., a nonmagnetic metal and a magnetic object. Referring to U.S. Pat. No. 6,770,857 (Aug. 3, 2004), a configuration of the all metal cooktop is disclosed.

However, the aforementioned method has a problem that a non-magnetic may not heat a nonmagnetic and non-metallic object. In addition, a heating efficiency may be lower than a radiant heater technology, and a material cost may be high.

SUMMARY

The present disclosure describes an induction heating type cooktop capable of heating both a magnetic object and a nonmagnetic object.

The present disclosure also describes implementations to prevent damage to a thin film (or thin layer, hereinafter referred as thin film) and other components included as a heating target in an induction heating type cooktop that is capable of heating both a magnetic object and a nonmagnetic object.

The present disclosure also describes an induction heating type cooktop having a thin film disposed in various ways so as to prevent damage or thermal deformation of the thin film. The thin film may be inductively heated when a working coil is operated to inductively heat a magnetic object or a nonmagnetic object placed on an upper plate of the cooktop.

Objects of the present disclosure are not limited thereto, and other objects and advantages of the present disclosure will be understood by the following description, and will become more apparent from implementations of the present disclosure. Furthermore, the objects, features and advantages of the present disclosure can be realized by means disclosed in the accompanying claims or combination thereof.

According to one aspect of the subject matter described in this application, an induction heating type cooktop includes a cover plate that is coupled to a top of a case and that includes an upper plate configured to seat an object to be heated, a working coil disposed inside the case and configured to heat the object, an insulator disposed between a bottom surface of the upper plate and the working coil, and a thin film that is disposed on at least one of a top surface of the upper plate or the bottom surface of the upper plate and that includes a plurality of sub-films that are arranged about a central portion of the thin film. An outer boundary of one of the plurality of sub-films is positioned on a radially different position from an outer boundary of another of the plurality of sub-films relative to the central portion of the thin film.

Implementations according to this aspect may include one or more of the following features. For example, the thin film may be coated on the at least one of the top surface of the upper plate or the bottom surface of the upper plate. In some examples, the thin film may be configured to, based on the object being placed on the top surface of the upper plate, form an equivalent circuit including a resistance component and an inductor component. In some examples, the working coil may be configured to, based on a magnetic object being placed on the top surface of the upper plate, apply an induced current to the magnetic object and the plurality of sub-films.

In some implementations, at least one of the plurality of sub-films may have a ring shape. In some examples, the plurality of sub-films may include a sub-film that is disposed at a center of the plurality of sub-films and that defines a hole in the central portion of the thin film. In some examples, the plurality of sub-films include a sub-film that is disposed at a center of the plurality of sub-films and that covers the central portion of the thin film.

In some implementations, a width of each of the plurality of sub-films is included in a predetermined range. In some examples, each of the plurality of sub-films may have a uniform width. In some examples, widths of the plurality of sub-films are different each other. In some examples, each of the plurality of sub-films has a non-uniform width which is included in a predetermined range.

In some implementations, the plurality of sub-films may be spaced apart from one another to thereby define a gap having one or more distances between two of the plurality of sub-films, which in included in a predetermined range. In some implementations, at least one of the plurality of sub-films may be made of a conductive material having a magnetic property. In some implementations, at least one of the plurality of sub-films is made of a conductive material having a nonmagnetic property.

In some implementations, each of the plurality of sub-films may have a thickness in a range from 0.5 μm to 1,000 μm, and the plurality of sub-films may be configured to, based on the object being placed on the upper plate, form an equivalent circuit including a resistance component and an inductor component to thereby be inductively heated by the working coil.

In some implementations, the plurality of sub-films may be configured to, based on a magnetic object being placed on the top surface of the upper plate, form, together with the magnet object, an equivalent circuit including a resistance component and an inductor component.

In some implementations, the thin film may include a plurality of layers that are made of different materials and that are disposed on the at least one of the top surface or the bottom surface of the upper plate. In some examples, at least one of the plurality of layers may be configured to, based on a nonmagnetic object being placed on the top surface of the upper plate, form an equivalent circuit including a resistance component and an inductor component to thereby be inductively heated. In some examples, at least one of the plurality of layers may be configured to form, together with the object, an equivalent circuit including a resistance component and an inductor component to thereby inductively heat the object that is made of aluminum.

In some implementations, a thickness of the thin film may be less than a skin depth of the thin film.

In some implementations, induction heating of a magnetic object and a nonmagnetic object may be performed using an induction heating device including a plurality of sub-films rather than a single thin film. In some cases, an attached thin film may be deformed by a difference in temperature at a portion which is repeatedly heated and cooled. In order to prevent or reduce such thermal deformation, the thin film to be inductively heated may include a plurality of sub-films to reduce the difference in temperature at the portion to be inductively heated in one thin film.

BRIEF DESCRIPTION OF THE DRAWINGS

The above and other aspects, features, and advantages of certain implementations will be more apparent from the following detailed description taken in conjunction with the accompanying drawings.

DETAILED DESCRIPTION

Figure 1:
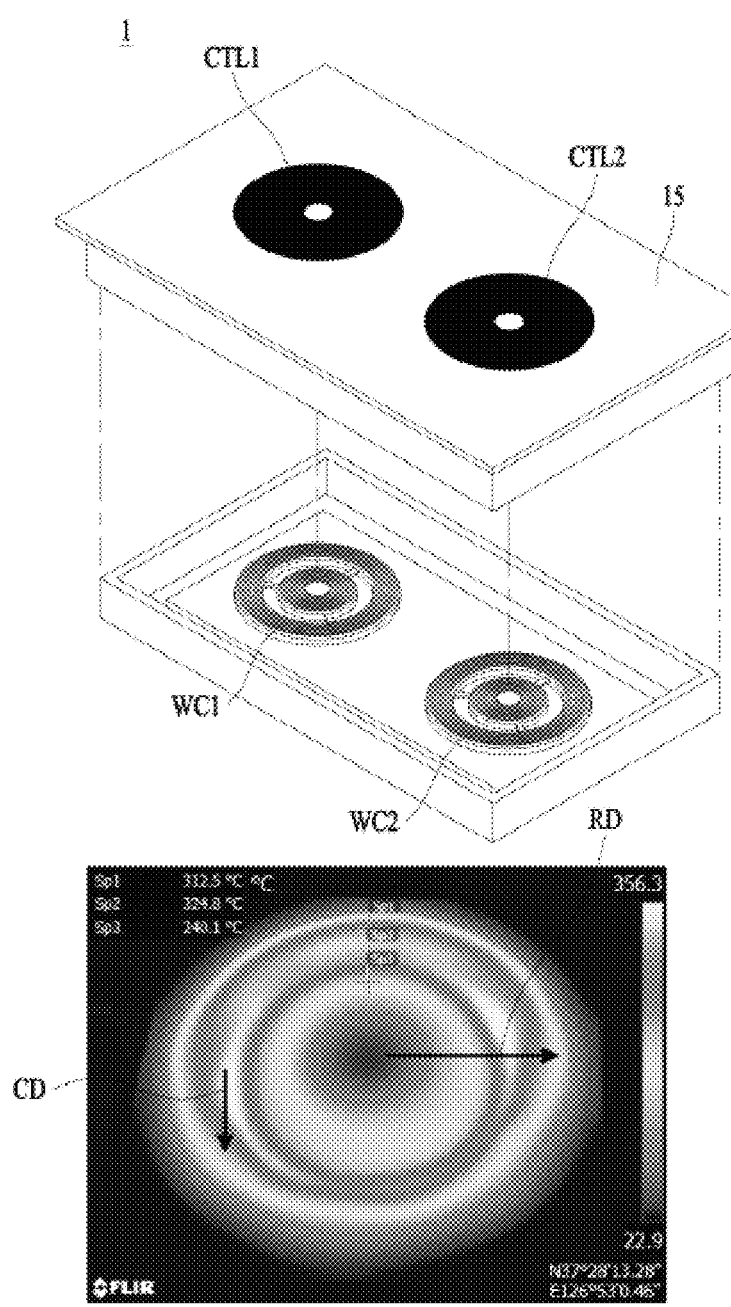
FIG. 1 is a diagram illustrating an example of an induction heating type cooktop in related art.

Hereinafter, implementations of the present disclosure will be described in detail with reference to the drawings so that those skilled in the art to which the present disclosure pertains can easily perform the present disclosure. The present disclosure may be implemented in many different forms and is not limited to the implementations described herein.

In order to illustrate this application, a part that is not related to the description may be omitted, and the same or similar components are denoted by the same reference numerals throughout the specification. Further, some implementations of this application will be described in detail with reference to exemplary drawings. In adding the reference numerals to the components of each drawing, the same components may have the same sign as possible even if they are displayed on different drawings. Further, in describing this application, when it is determined that a detailed description of a related known configuration and a function may obscure the gist of this application, the detailed description thereof will be omitted.

Further, in implementing the present disclosure, for convenience of explanation, components may be described by being subdivided; however, these components may be implemented in a device or a module, or a single component may be implemented by being divided into a plurality of devices or modules.

FIG. 1 illustrates an induction heating type cooktop in related art.

For example, the induction heating type cooktop 1 may include working coils WC1 and WC2 to heat an object made of a material capable of being inductively heated. For example, the working coils WC1 and WC2 may be operated to inductively heat a magnetic material disposed on an upper plate 15. In some cases, where thin films CTL1 and CTL2 are capable of being inductively heated, a nonmagnetic object disposed on the upper plate 15 may be indirectly heated. That is, the thin films CTL1 and CTL2 may be made of a predetermined material capable of being inductively heated. Accordingly, the thin films CTL1 and CTL2 may be inductively heated in the course of induction heating of a target heating object disposed on the upper plate 15. Here, the target heating object to be indirectly heated through the inductively heated thin films CTL1 and CTL2 may be heated faster as the areas of the thin films CTL1 and CTL2 are wider and thicker. The area for heating the target heating object may correspond to the entire area in which a physical configuration constituting the thin films CTL1 and CTL2 faces the target heating object.

The thin films CTL1 and CTL2 to be inductively heated may have a heat distribution of a portion to be heated according to a shape thereof. For example, when the thin films CTL1 and CTL2 have a ring shape forming a loop, the heat distribution of the thin films CTL1 and CTL2 may change along a circumferential direction (CD) and a radial direction (RD) of the loop. In particular, the inductively heated ring-shaped thin films CTL1 and CTL2 have the highest temperature portion to the lowest temperature portion within a predetermined radius range, and the temperature difference between the thin films CTL1 and CTL2 may lead to thermal deformation with respect to the shape of a single component included in the thin films CTL1 and CTL2.

In some cases, the thin films CTL1 and CTL2 each may include a wide single film to heat the entire bottom surface of a target heating object and to quickly heat the target heating object. In some cases, where the thin films CTL1 and CTL2 include a single film are inductively heated, although the single film is heated as a whole, the central portion of the single film may be heated to the highest temperature in the radial direction, and the single film may be heated to the lowest temperature toward the outer or inner boundary. Referring to FIG. 1, the thin films CTL1 and CTL2 may each include a ring-shaped single film. A central portion Sp2 of the single film may be inductively heated to the highest temperature, and a remaining portion Sp3 adjacent to the inner boundary or a remaining portion Sp1 adjacent to the outer boundary may be heated to a relatively low temperature. Such temperature distribution in each of the inductively heated thin films CTL1 and CTL2 is resulted because the intensity distribution of each of the magnetic fields generated by the working coils WC1 and WC2 is not uniform. Since the non-uniform magnetic field of each of the working coils WC1 and WC2 passes through a single film, the heat generated inside each of the large-area thin films CTL1 and CTL2 is also not uniform on each surface. The temperature difference in each of these components leads to thermal deformation, which makes the thin films CTL1 and CTL2 relatively inferior in durability.

Hereinafter, various implementations of an induction heating type cooktop for preventing thermal deformation will be described according to the present application.

Figure 2:
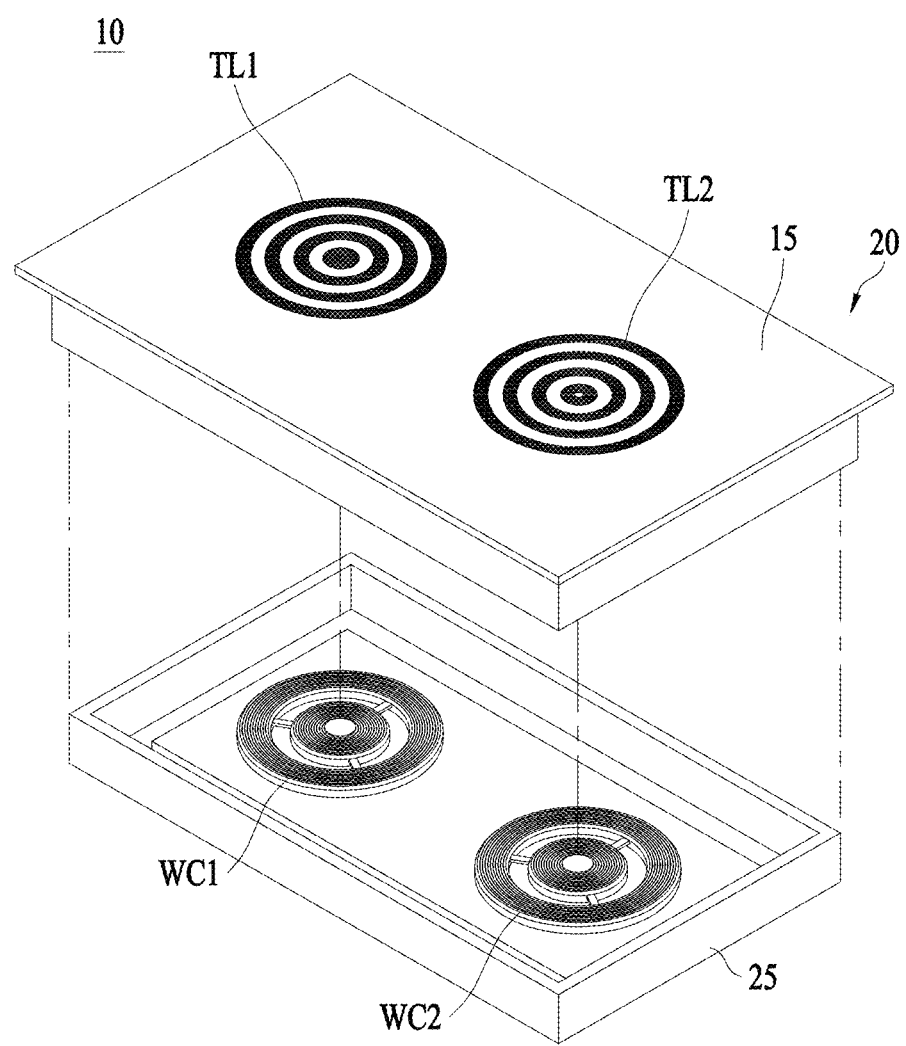
FIG. 2 is a diagram illustrating an example of an induction heating type cooktop according to the present application.

FIG. 2 is a diagram illustrating an example of an induction heating type cooktop.

Referring to FIG. 2, an induction heating type cooktop 10 may include a case 25, a cover plate 20, working coils WC1 and WC2 (that is, first and second working coils), and thin films TL1 and TL2 (that is, first and second thin films).

The working coils WC1 and WC2 may be installed in the case 25.

In some implementations, a variety of devices related to driving of a working coil other than the working coils WC1 and WC2 may be installed in the case 25. For example, the devices relating to driving of a working coil may include a power part for providing alternating current power, a rectifying part for rectifying alternating current power from the power part to direct current power, an inverter part for inverting the direct power rectified by the rectifying part to a resonance current through a switching operation, a control part for controlling operations of various devices in the induction heating type cooktop 10, a relay or a semiconductor switch for turning on and off a working coil, and the like. Regarding this, a detailed description will be herein omitted.

The cover plate 20 may be coupled to a top of the case 25, and may include an upper plate 15 for placing a target object to be heated on the top.

For example, the cover plate 20 may include the upper plate 15 for placing a target object to be heated, such as a cooking vessel.

In some examples, the upper plate 15 may be made of a glass material (e.g., ceramic glass).

In some implementations, an input interface may be provided in the upper plate 15 to receive an input from a user and transfer the input to a control part that serves as an input interface. The input interface may be provided at a position other than the upper plate 15.

The input interface may be configured to allow a user to input a desired heat intensity or an operation time of the induction heating type cooktop 10. The input interface may be implemented in various forms, such as a mechanical button or a touch panel. The input interface may include, for example, a power button, a lock button, a power control button (+, −), a timer control button (+, −), a charging mode button, and the like. The input interface may transfer an input provided by a user to a control part for the input interface, and the control part for the input interface may transfer the input to the aforementioned control part (that is, a control part for an inverter). The aforementioned control part may control operations of various devices (e.g., a working coil) based on an input (that is, a user input) provided from the control part for the input interface, and a detailed description thereof will be omitted. In some examples, the control part may be a controller, a processor, or an electric circuit.

The upper plate 15 may visually display whether the working coils WC1 and WC2 are being driven or not and intensity of heating (that is, thermal power). For example, a fire hole shape may be displayed in the upper plate 15 by an indicator that includes a plurality of light emitting devices (e.g., light emitting diodes (LEDs)) provided in the case 25.

The working coils WC1 and WC2 may be installed inside the case 25 to heat a target heating object.

Specifically, driving of the working coils WC1 and WC2 may be controlled by the aforementioned control part. When the target heating object is positioned on the upper plate 15, the working coils WC1 and WC2 may be driven by the control part.

In some implementations, the working coils WC1 and WC2 may directly heat a magnetic target heating object (that is, a magnetic object) and may indirectly heat a nonmagnetic target heating object (that is, a nonmagnetic object) through the thin films TL1 and TL2 which will be described in the following.

The working coils WC1 and WC2 may heat a target heating object by employing an induction heating method and may be provided to overlap the thin films TL1 and TL2 in a longitudinal direction (that is, a vertical direction or an up-down direction).

Although FIG. 2 illustrates that two working coils WC1 and WC2 are installed in the case 25, but aspects of the present disclosure are not limited thereto. That is, one working coil or three or more working coils may be installed in the case 25. Yet, for convenience of explanation, an example in which two working coils WC1 and WC2 are installed in the case 25 will be described.

The thin films TL1 and TL2 may be coated on the upper plate 15 to heat a nonmagnetic object among target heating objects.

Specifically, the thin films TL1 and TL2 may be coated on at least one of a top surface and a bottom surface of the upper plate 15 and may be provided to overlap the working coils WC1 and WC2 in a longitudinal direction (that is, a vertical direction or an up-down direction). Accordingly, it may be possible to heat the corresponding target heating object, regardless of a position and a type of the target heating object.

The thin films TL1 and TL2 may have at least one of a magnetic property and a nonmagnetic property (that is, either or both of the magnetic property and the nonmagnetic property).

The thin films TL1 and TL2 may be, for example, made of a conductive material (e.g., aluminum). As illustrated in the drawing, the thin films TL1 and TL2 may be coated on a top surface of the upper plate 15 by taking the form of a plurality of rings having different diameters. However, aspects of the present disclosure are not limited thereto.

That is, the thin films TL1 and TL2 may include a material other than a conductive material and may be coated on the upper plate 15 by taking a different form. Hereinafter, for convenience of explanation, an example in which the thin films TL1 and TL2 is made of a conductive material and coated on the upper plate 15 in the form of a plurality of rings having different diameters will be described.

FIG. 2 shows the two thin films TL1 and TL2, but the number of thin films included in the cooktop 10 is not limited thereto. That is, the cooktop 10 may include at least one thin film as a thin film corresponding to each working coil.

However, FIG. 2 is a diagram illustrating an exemplary dispositional relationship between elements used in the present disclosure. Therefore, shapes, numbers, and positions of the elements should not be construed as being limited to the example shown in FIG. 2.

The thin films TL1 and TL2 will be described later with reference to FIG. 11 and following drawings.

Figure 3:
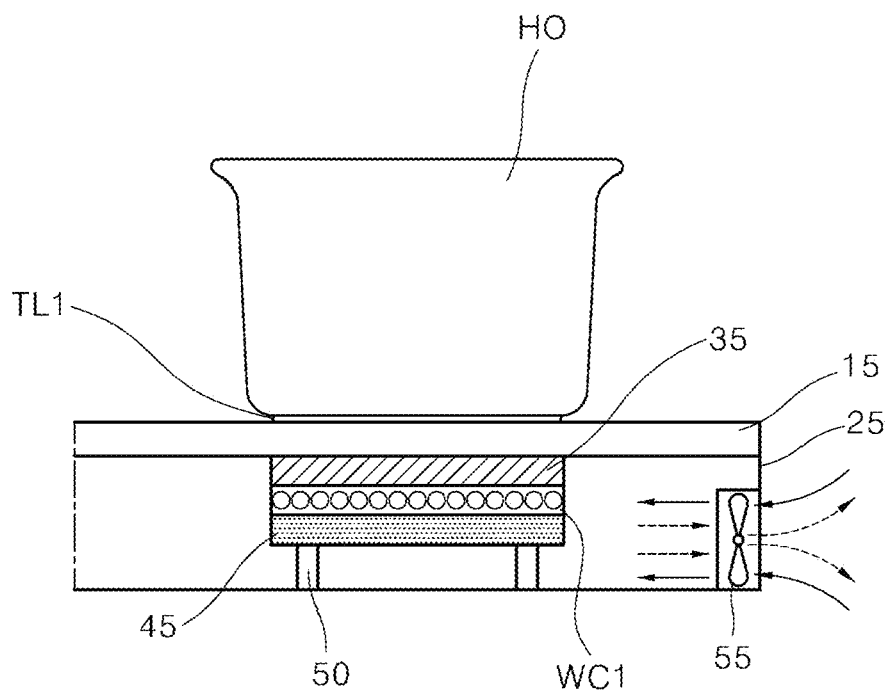
FIG. 3 is a diagram illustrating example elements disposed in an example case of the induction heating type cooktop shown in FIG. 2.

FIG. 3 is a diagram illustrating example elements provided inside a case of the induction heating type cooktop shown in FIG. 2.

Referring to FIG. 3, the induction heating type cooktop 10 may further include an insulator 35, a shield plate 45, a support member 50, and a cooling fan 55.

Since elements disposed in the surroundings of a first working coil WC1 are identical to elements disposed in the surroundings of a second working coil WC2 (the working coil in FIG. 2), the elements (e.g., the first thin film TL1, the insulator 35, the shield plate 45, the support member 50, and the cooling fan 55) in the surroundings of the first working coil WC1 will be hereinafter described for convenience of explanation.

The insulator 35 may be provided between a bottom surface of the upper plate 15 and the first working coil WC1.

Specifically, the insulator 35 may be mounted to the cover plate 20, that is, the bottom of the upper plate 15. The first working coil WC1 may be disposed below the insulator 35.

The insulator 35 may block heat, which is generated when the first thin film TL1 or a target heating object HO is heated upon driving of the first working coil WC1, from being transferred to the first working coil WC1.

That is, when the first thin film TL1 or the target heating object HO is heated by electromagnetic induction of the first working coil WC1, heat of the first thin film TL1 or the target heating object HO may be transferred to the upper plate 15 and the heat transferred to the upper plate 15 may be transferred to the first working coil WC1, thereby possibly causing damage to the first working coil WC1.

By blocking the heat from being transferred to the first working coil WC1, the insulator 35 may prevent damage of the first working coil WC1 caused by the heat and furthermore prevent degradation of heating performance of the first working coil WC1.

A spacer, which is not an essential constituent element, may be installed between the first working coil WC1 and the insulator 35.

Specifically, the spacer may be inserted between the first working coil WC1 and the insulator 35, so that the first working coil WC1 and the insulator 35 do not directly contact each other. Accordingly, the spacer may block heat, which is generated when the first thin film TL1 and the target heating object HO are heated upon driving of the first working coil WC1, from being transferred to the first working coil WC1 through the insulator 35.

That is, since the spacer may share the role of the insulator 35, it may be possible to minimize a thickness of the insulator 35 and accordingly minimize a gap between the target heating object HO and the first working coil WC1.

In addition, a plurality of spacers may be provided, and the plurality of spaces may be disposed to be spaced apart from each other in the gap between the first working coil WC1 and the insulator 35. Accordingly, air suctioned into the case 25 by the cooling fan 55 may be guided to the first working coil WC1 by the spacer.

That is, the spacer may guide air, introduced into the case 25 by the cooling fan 55, to be properly transferred to the first working coil WC1, thereby improving cooling efficiency of the first working coil WC1.

The shield plate 45 may be mounted to a bottom of the first working coil WC1 to block a magnetic field occurring downwardly upon driving of the first working coil WC1.

Specifically, the shield plate 45 may block the magnetic field occurring downwardly upon driving of the first working coil WC1 and may be supported upwardly by the support member 50.

The support member 50 may be installed between a bottom surface of the shield plate 45 and a bottom surface of the case 25 to support the shield plate 45 upwardly.

Specifically, by supporting the shield plate 45 upwardly, the support member 50 may indirectly support the insulator 35 and the first working coil WC1 upwardly. In doing so, the insulator 35 may be brought into tight contact with the upper plate 15.

As a result, it may be possible to maintain a constant gap between the first working coil WC1 and the target heating object HO.

The support member 50 may include, for example, an elastic object (e.g., a spring) to support the shield plate 45 upwardly, but aspects of the present disclosure are not limited thereto. In addition, the support member 50 is not an essential element and thus it may be omitted from the induction heating type cooktop 10.

The cooling fan 55 may be installed inside the case 25 to cool the first working coil WC1.

Specifically, driving of the cooling fan 55 may be controlled by the aforementioned control part and the cooling fan 55 may be installed at a side wall of the case 25. The cooling fan 55 may be installed at a position other than the side wall of the case 25. In an implementation, for convenience of explanation, an example in which the cooling fan 55 is installed at the side wall of the case 25 will be described.

The cooling fan 55 may suction outdoor air from the outside of the case 25, as shown in FIG. 3, and transfer the suctioned air to the first working coil WC1. The cooling fan 55 may suction indoor air (e.g., heated air) of the case 25 and discharge the suctioned air to the outside of the case 25.

In doing so, it may be possible to efficiently cool internal elements (e.g., first working coil WC1) of the case 25.

In some examples, the outdoor air transferred from the outside of the case 25 to the first working coil WC1 by the cooling fan may be guided to the first working coil WC1 by the spacer. Accordingly, it may be possible to directly and efficiently cool the first working coil WC1, thereby improving endurance of the first working coil WC1. That is, it may be possible to improve the endurance by preventing thermal damage.

In some examples, the induction heating type cooktop 10 may include one or more of the above-described features and configurations. Hereinafter, features and configurations of the aforementioned thin film will be described in more detail with reference to FIGS. 4 to 7.

Figure 4:
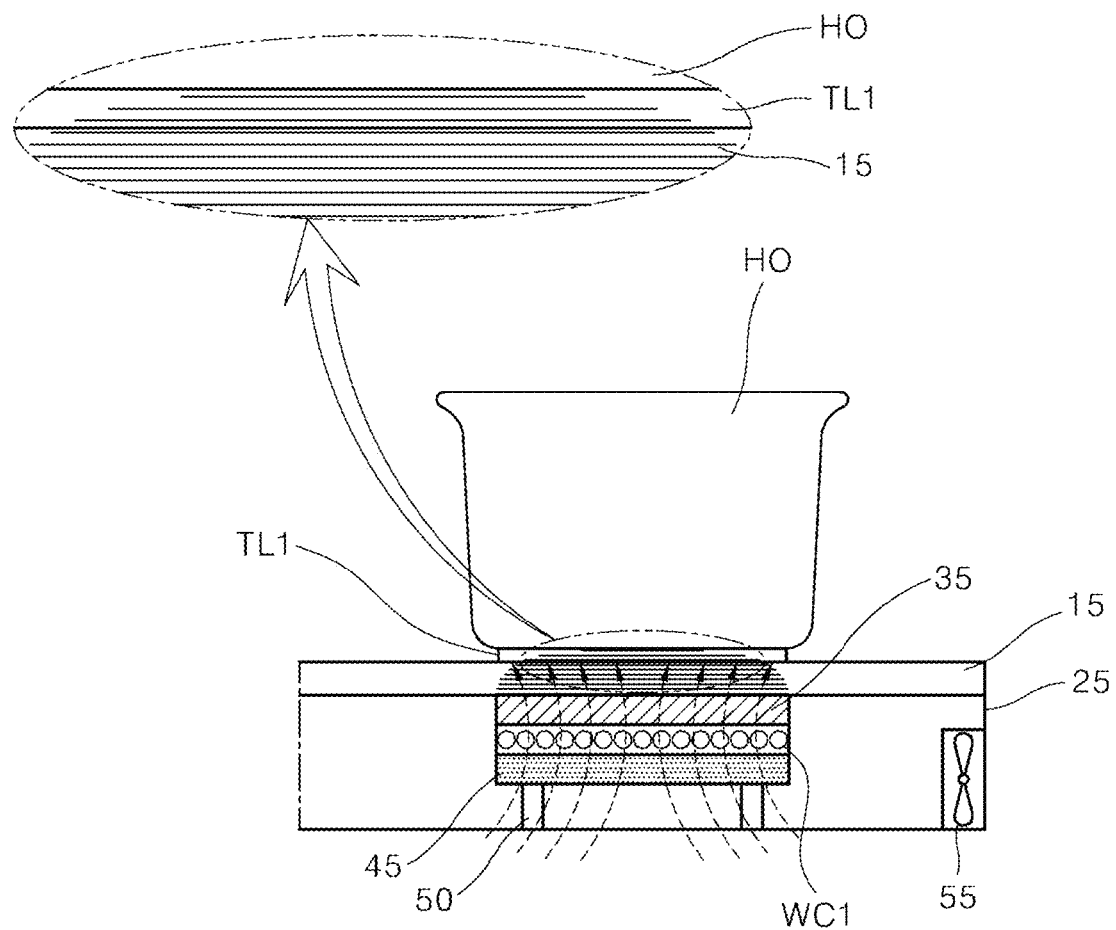
FIGS. 4 and 5 are diagrams illustrating examples of a thickness of a thin film and a skin depth of the thin film of an induction heating type cooktop.
Figure 5:
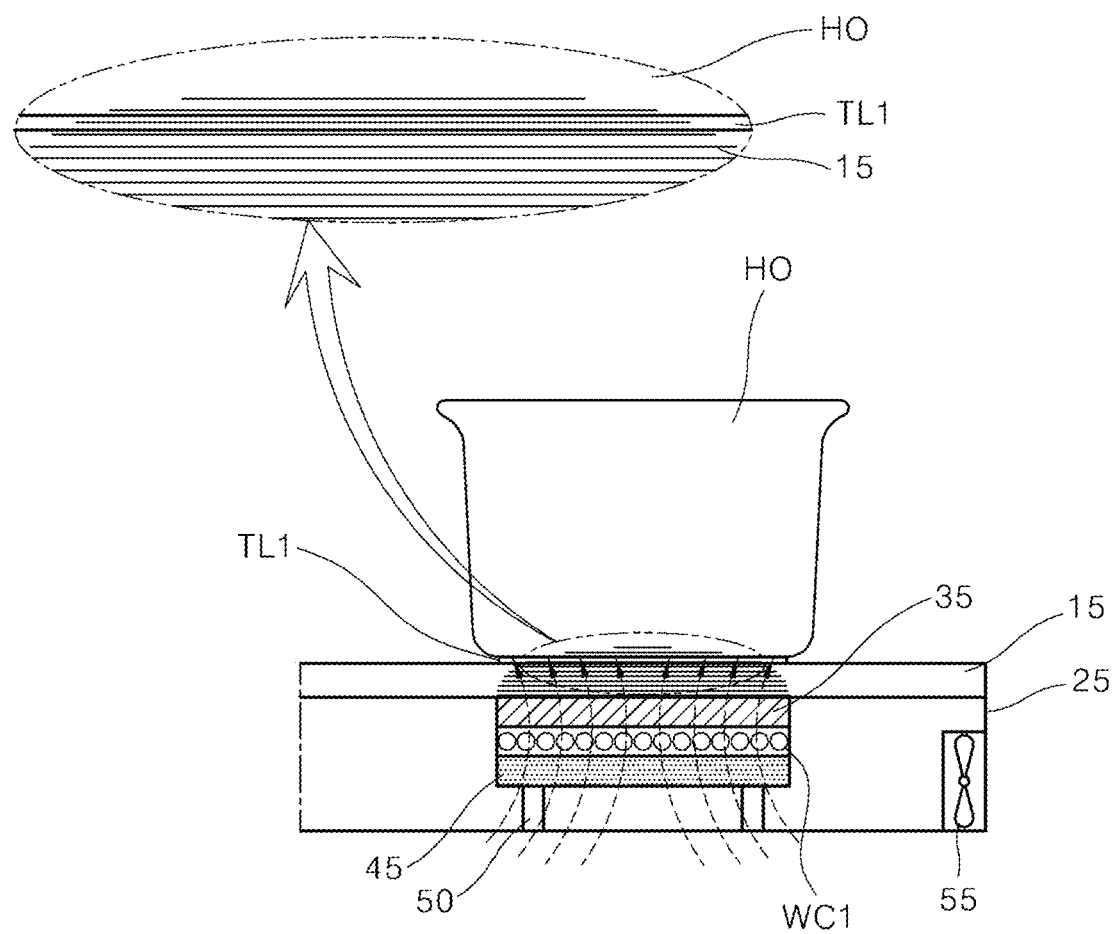
Figure 6:
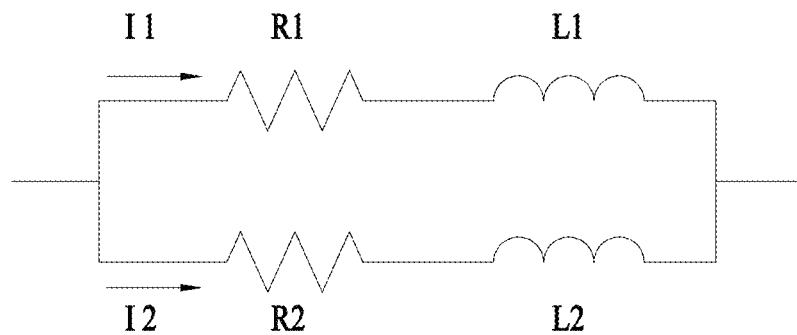
FIGS. 6 and 7 are diagrams illustrating examples of an electric impedance between a thin film and a target heating object depending on a type of the target heating object.
Figure 7:
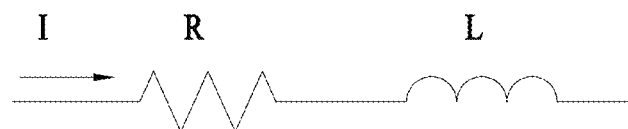

FIGS. 4 and 5 are diagrams illustrating a relation between a thickness and a skin depth of a thin film. FIGS. 6 and 7 are diagrams illustrating a variation of impedance between a thin film and a target heating object depending on a type of the target heating object.

The first thin film TL1 and the second thin film TL2 have the same technical features, and the thin film TL1 and TL2 may be coated on the top surface or the bottom surface of the upper plate 15. Hereinafter, for convenience of explanation, the first thin film TL1 coated on the top surface of the upper plate 15 will be described as an example.

The first thin film TL1 has the following features.

In some implementations, the first thin film TL1 may include a material having a low relative permeability.

For example, since the first thin film TL1 has a low relative permeability, the skin depth of the first thin film TL1 may be deep. The skin depth may refer to a depth by which a current can penetrate a material surface, and the relative permeability may be disproportional to the skin depth. Accordingly, the lower the relative permeability of the first thin film TL1, the deeper the skin depth of the first thin film TL1.

In some examples, the skin depth of the first thin film TL1 may have a value greater than a value corresponding to a thickness of the first thin film TL1. That is, since the first thin film TL1 has a thin thickness (e.g., a thickness of 0.1 μm~1,000 μm) and a skin depth of the first thin film TL1 is greater than the thickness of the first thin film TL1, a magnetic field occurring by the first working coil WC1 may pass through the first thin film TL1 and be then transferred to the target heating object HO. As a result, an eddy current may be induced to the target heating object HO.

That is, as illustrated in FIG. 4, when the skin depth of the first thin film TL1 is narrower than the thickness of the first thin film TL1, it is difficult for the magnetic field occurring by the first working coil WC1 to reach the target heating object HO.

In some implementations, as illustrated in FIG. 5, when the skin depth of the first skin depth TL1 is deeper than the thickness of the first thin film TL1, most of the magnetic field generated by the first working coil WC1 may be transferred to the target heating object HO. That is, since the skin depth of the first thin film TL1 is deeper than the thickness of the first thin film TL1, the magnetic field generated by the first working coil WC1 may pass through the first thin film TL1 and most of the magnetic field energy may be dissipated in the target heating object HO. In doing so, the target heating object HO may be heated primarily.

Since the first thin film TL1 has a thin thickness as described above, the thin film TL1 may have a resistance value that allows the first thin film TL1 to be heated by the first working coil WC1.

Specifically, the thickness of the first thin film TL1 may be disproportional to the resistance value of the first thin film TL1 (that is, a sheet resistance value). That is, the thinner the thickness of the first thin film TL1 coated on the upper plate 15, the greater the resistance value (that is, the sheet resistance) of the first thin film TL1. As thinly coated on the upper plate 15, the first thin film TL1 may change in property to a load resistance at which heating may be possible.

The first thin film TL1 may have a thickness of, for example, 0.1 μm to 1,000 μm, but not limited thereto.

The first thin film TL1 having the above-described characteristic is present to heat a nonmagnetic object, and thus, an impedance property between the first thin film TL1 and the target heating object HO may vary according to whether the target heating object HO positioned on the top of the upper plate 15 is a magnetic object or a nonmagnetic object.

One or more examples, where the target heating object is a magnetic object, will be described in the following.

Referring to FIGS. 3 and 6, when the first working coil WC1 is driven while a magnetic target heating object HO is positioned on the top of the upper plate 15, a resistance component R1 and an inductor component L1 of the magnetic target heating object HO may form an equivalent circuit to that of a resistance component R2 and an inductor component L2 of the first thin film TL1.

In this case, in the equivalent circuit, an impedance (that is, an impedance of R1 and L1) of the magnetic target heating object HO may be smaller than an impedance (that is, an impedance of R2 and L2) of the first thin film TL1.

Accordingly, when the aforementioned equivalent circuit is formed, the magnitude of an eddy current I1 applied to the magnetic target heating object HO may be greater than the magnitude of an eddy current I2 applied to the first thin film TL1. More specifically, most of eddy currents may be applied to the target heating object HO, thereby heating the target heating object HO.

That is, when the target heating object HO is a magnetic object, the aforementioned equivalent circuit may be formed and most of eddy currents may be applied to the target heating object HO. Accordingly, the first working coil WC1 may directly heat the target heating object HO.

Since some of eddy currents is applied even to the first thin film TL1, the first thin film TL1 may be heated slightly. Accordingly, the target heating object HO may be indirectly heated to a certain degree by the thin film TL1. However, a degree to which the target heating object HO is heated indirectly by the first thin film TL1 may not be considered significant, as compared with a degree to which the target heating object HO is heated directly by the first working coil WC1.

One or more examples, where a target heating object is a nonmagnetic object, will be described in the following.

Referring to FIGS. 3 and 7, when the working coil WC1 is driven while a nonmagnetic target heating object HO is positioned on the top of the upper plate 15, an impedance may not exist in the nonmagnetic target heating object HO but exists in the first thin film TL1. That is, a resistance component R and an inductor component L may exist only in the first thin film TL1.

Accordingly, an eddy current I may be applied only to the first thin film TL1 and may not be applied to the nonmagnetic target heating object HO. More specifically, the eddy current I may be applied only to the first thin film TL1, thereby heating the first thin film TL1.

That is, when the target heating object HO is a nonmagnetic object, the eddy current I may be applied to the first thin film TL1, thereby heating the first thin film TL1. Accordingly, the nonmagnetic target heating object HO may be indirectly heated by the first thin film TL1 that is heated by the first working coil WC1.

To put it briefly, regardless of whether the target heating object HO is a magnetic object or a nonmagnetic object, the target heating object HO may be heated directly or indirectly by a single heating source which is the first working coil WC1. That is, when the target heating object HO is a magnetic object, the first working coil WC1 may directly heat the target heating object HO, and, when the target heating object HO is a nonmagnetic object, the first thin film TL1 heated by the first working coil WC1 may indirectly heat the target heating object HO.

As described above, the induction heating type cooktop 10 may be capable of heating both a magnetic object and a nonmagnetic object. Thus, the induction heating type cooktop 10 may be capable of heating a target heating object regardless of a position and a type of the target heating object. Accordingly, without determining whether the target heating object is a magnetic object or a nonmagnetic object, a user is allowed to place the target heating object in any heating region on the top plate, and therefore, convenience of use may improve.

In addition, the induction heating type cooktop 10 may directly or indirectly heat a target heating object using the same heating source, and therefore, a heat plate or a radiant heater is not necessary. Accordingly, it may be possible to increase heating efficiency and cut down a material cost.

Hereinafter, an induction heating type cooktop will be described.

Figure 8:
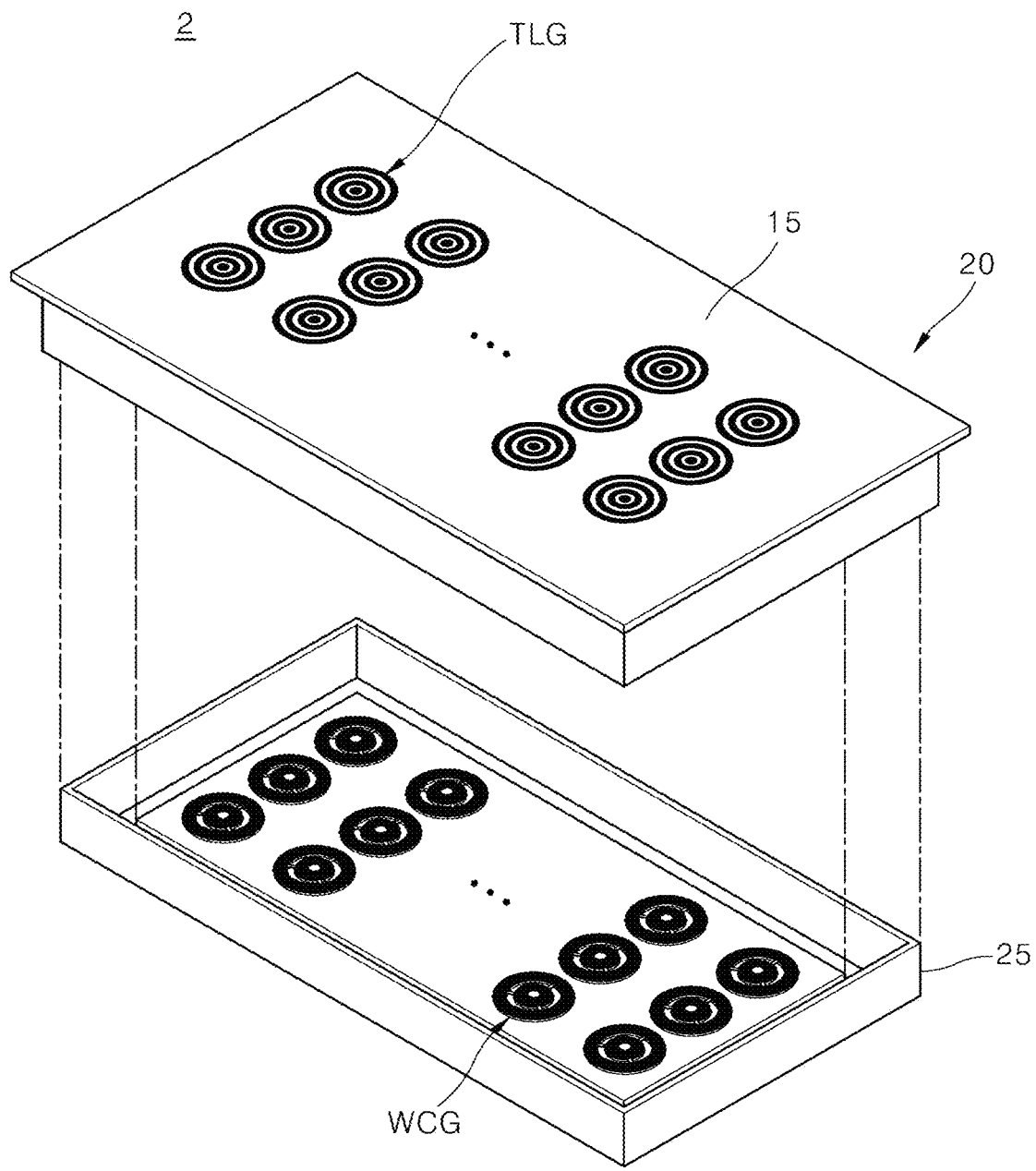
FIG. 8 is a diagram illustrating an example of an induction heating type cooktop.
Figure 9:
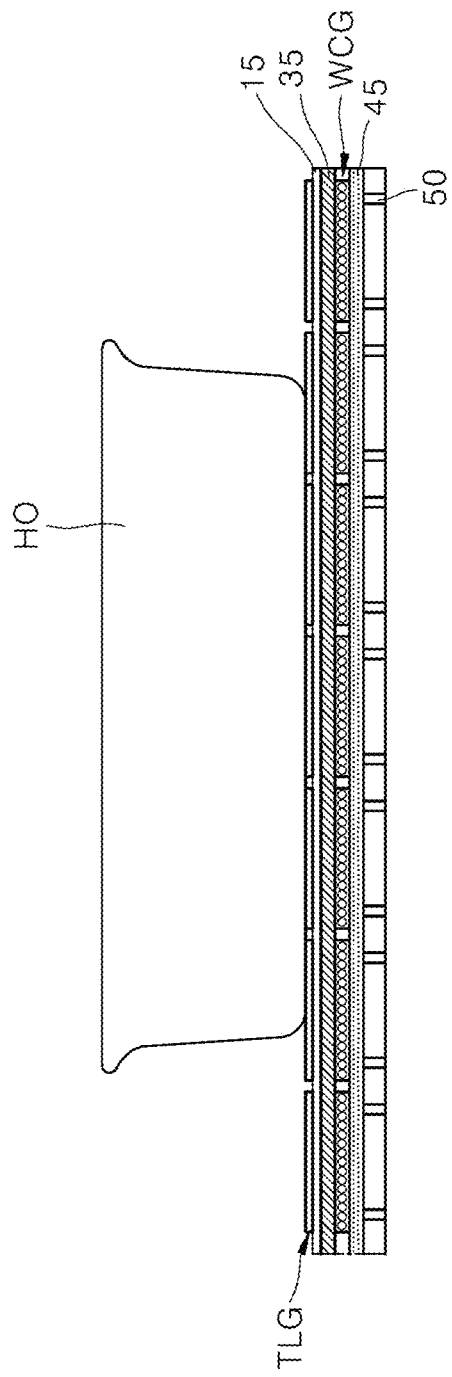
FIG. 9 is a diagram illustrating example elements disposed in an example case of the induction heating type cooktop shown in FIG. 8.
Figure 10:
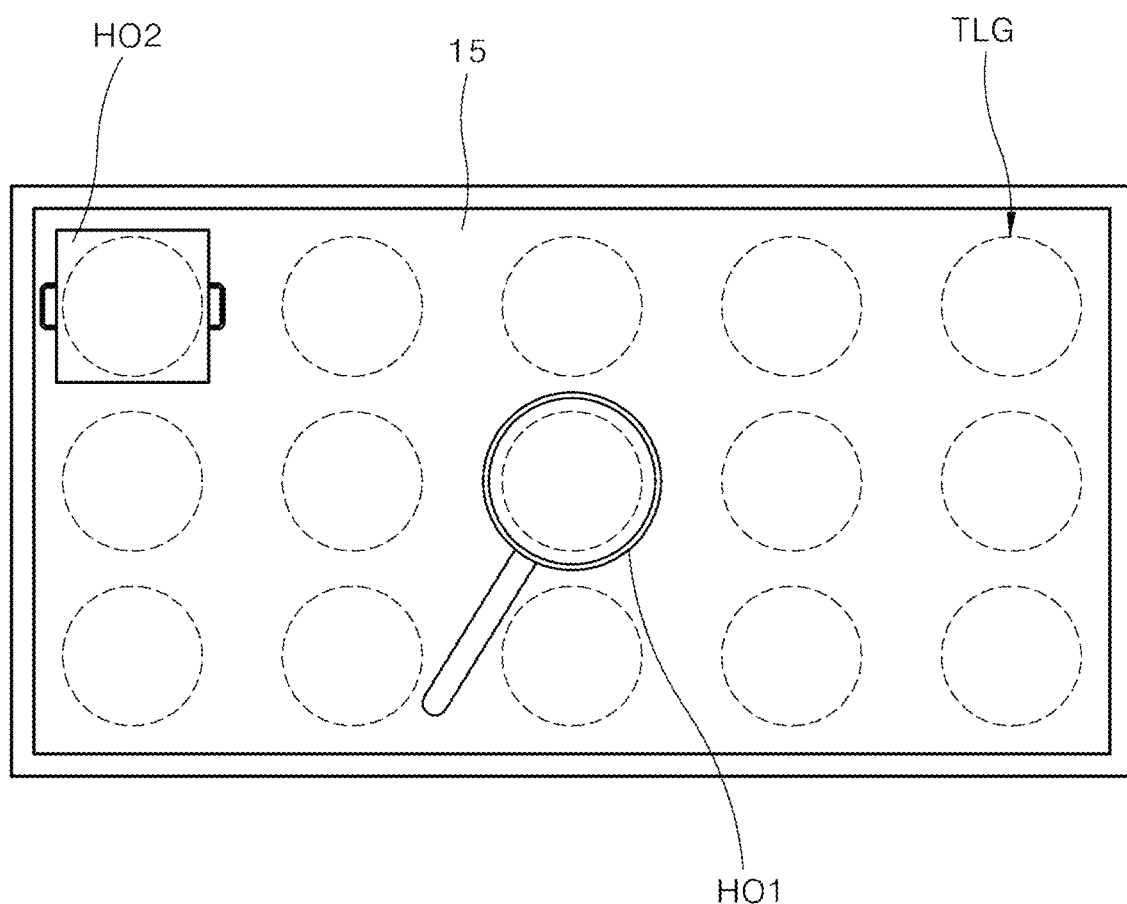
FIG. 10 is a diagram illustrating an example of a target heating object positioned on the induction heating type cooktop shown in FIG. 8.

FIG. 8 is a diagram illustrating an example of an induction heating type cooktop. FIG. 9 is a diagram illustrating example elements provided inside a case of the induction heating type cooktop shown in FIG. 8. FIG. 10 is a diagram illustrating an example of a target heating object positioned at the induction heating type cooktop shown in FIG. 8.

An induction heating type cooktop 2 is identical to the induction heating type cooktop 10 shown in FIG. 2, except for some elements and effects. Hence, a difference compared to the induction heating type cooktop 10 will be focused and described.

Referring to FIGS. 8 and 9, the induction heating type cooktop 2 may be a zone-free cooktop.

Specifically, the induction heating type cooktop 2 may include a case 25, a cover plate 20, a plurality of thin films TLGs, an insulator 35, a plurality of working coils WCGs, a shield plate 45, a support member 50, a cooling fan, a spacer and a control part.

Here, the plurality of thin films TLGs and the plurality of WCGs may overlap in a traverse direction and may be disposed to correspond to each other in a one-to-one relationship. The plurality of thin films TLGs and the plurality of thin films WCGs may be in a many-to-many relationship rather than the one-to-one relationship. In some implementations, for example, the plurality of thin films TLGs and the plurality of working coils WCGs may be arranged in a one-to-one relationship.

For instance, the induction heating type cooktop 2 may be a zone-free cooktop including the plurality of thin films TLGs and the plurality of working coils WCGs, and therefore, it may be possible to heat a single target heating object HO by using some or all of the plurality of working coils WCGs at the same time or by using some or all of the plurality of thin films TLGs at the same time. In some examples, it may be possible to heat the target heating object HO by using both some or all of the plurality of working coils WCG and some or all of the plurality of thin films TLGs.

Accordingly, as shown in FIG. 10, in a region where the plurality of working coils WCG (see FIG. 9) and the plurality of thin films TLG are present (e.g., a region of the upper plate 15), it may be possible to heat target heating objects HO1 and HO2, regardless of sizes, positions, and types of the target heating objects HO1 and HO2.

Figure 11:
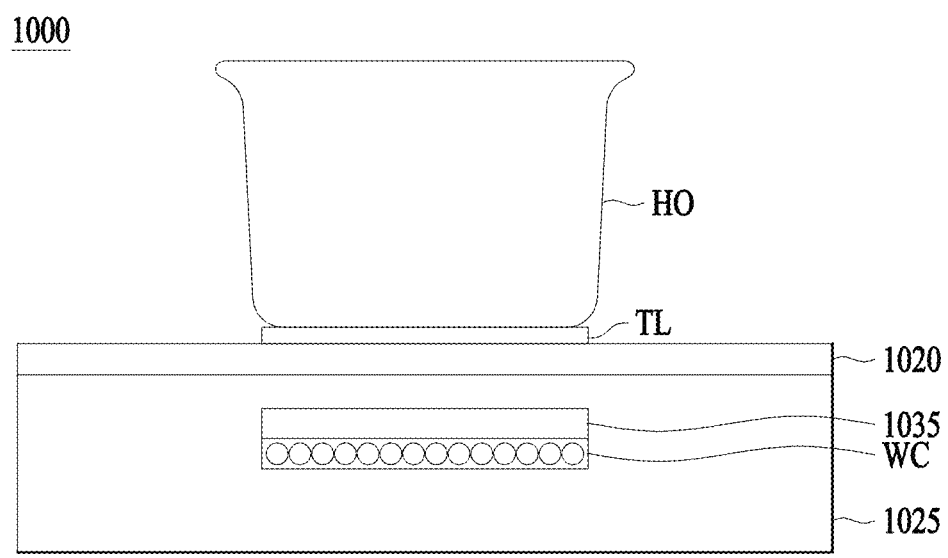
FIG. 11 is a diagram illustrating example elements disposed in an example case of an induction heating type cooktop having a thin film.
Figure 11:
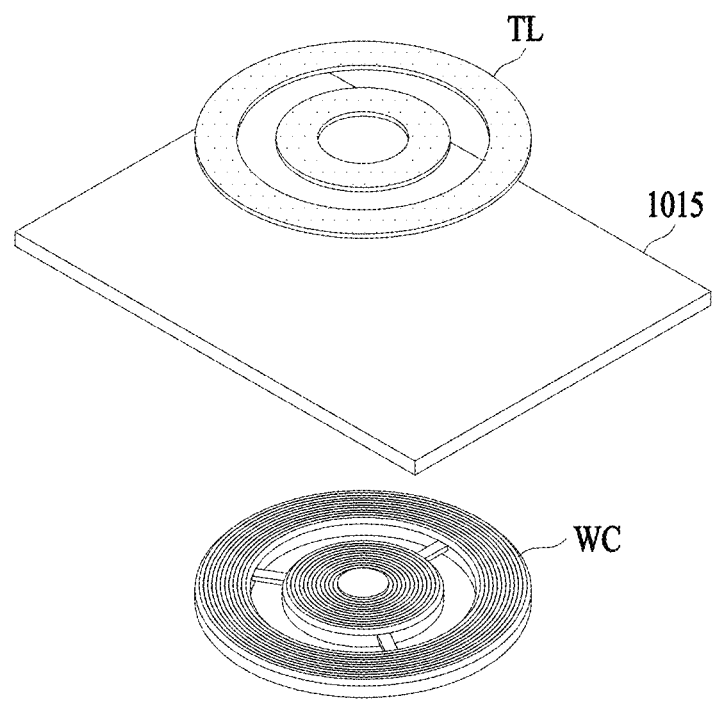

FIG. 11 is a diagram illustrating example elements provided in a case of an induction heating type cooktop 1000 having a thin film TL.

In some implementations, the induction heating type cooktop 1000 described in FIG. 11 and other following drawings may correspond to the induction heating type cooktop 10 used in various implementations described with reference to FIGS. 2 to 10. Hence, elements of the induction heating type cooktop 1000 not illustrated in FIG. 11 and other following drawings may be understood as selectively including elements of the cooktop 10 within the scope supported by the descriptions of FIGS. 2 to 10.

In some implementations, the induction heating type cooktop 1000 may include a cover plate 1020 coupled to the top of a case 1025 and having an upper plate 1015 allowing a target heating object HO to be placed on a top thereof, a working coil WC provided inside the case 1025 to heat the target heating object HO, a thin film TL disposed on at least one of a top and a bottom of the upper plate 1015, and an insulator 1035 provided between a bottom surface of the upper plate 1015 and the working coil WC, the thin film TL may include a plurality of sub-films each having a different distance from a central portion to an outermost boundary.

In some implementations, a gap for preventing heat transfer from the inductively heated thin film TL may exist as a buffer between the working coil WC and the thin film TL disposed on at least one of a top and a bottom of an upper plate 1015.

Referring to FIG. 11, the cooktop 1000 may include a thin film TL including a plurality of sub-films on the top of the upper plate 1015, the thin film TL disposed on the top of the upper plate 1015 may be coated on the top surface of the upper plate 1015. The thin film TL coated on the top surface of the upper plate 1015 may be coated by various methods such as vacuum deposition (e.g., physical vapor deposition (PVD), etc.).

In some implementations, the thin film TL may be made of a material (e.g., silver (Ag), copper (Cu), nickel (Ni), STS, etc.) capable of being inductively heated by the working coil WC, and may be determined to be arranged with an optimal thickness.

In some implementations, the thin film TL may be an inductively heated material. For example, when the object to be heated HO is made of aluminum, the thin film TL may include a layer made of a material capable of being inductively heated together with a target heating object. That is, the target heating object HO made of aluminum and the thin film TL including the plurality of sub-films may form an equivalent circuit including a resistance component and an inductor component, and the resistance component and the inductor component constituting the equivalent circuit may be included at least in part within a predetermined range of components capable of being inductively heated by the working coil WC.

In some implementations, the thin film TL may be in contact with the upper surface of the upper plate 1015 through an adhesive layer for adhesion to the upper plate 1015 made of a glass material or the like. For example, the adhesive layer may be made of a material suitable for adhesion between different materials (e.g., glass and metal), the adhesive layer may be pretreated by plasma, etching, or the like, the thin film TL may be protected by a protective layer applied after being coated on the top surface of the upper plate 1015.

Figure 12:
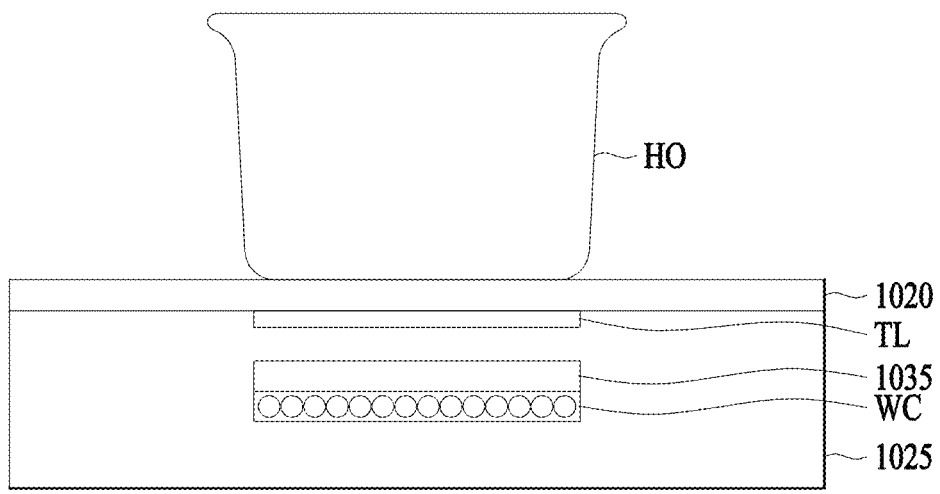
FIG. 12 is a diagram illustrating example elements disposed in an example case of an induction heating type cooktop having a thin film.
Figure 12:
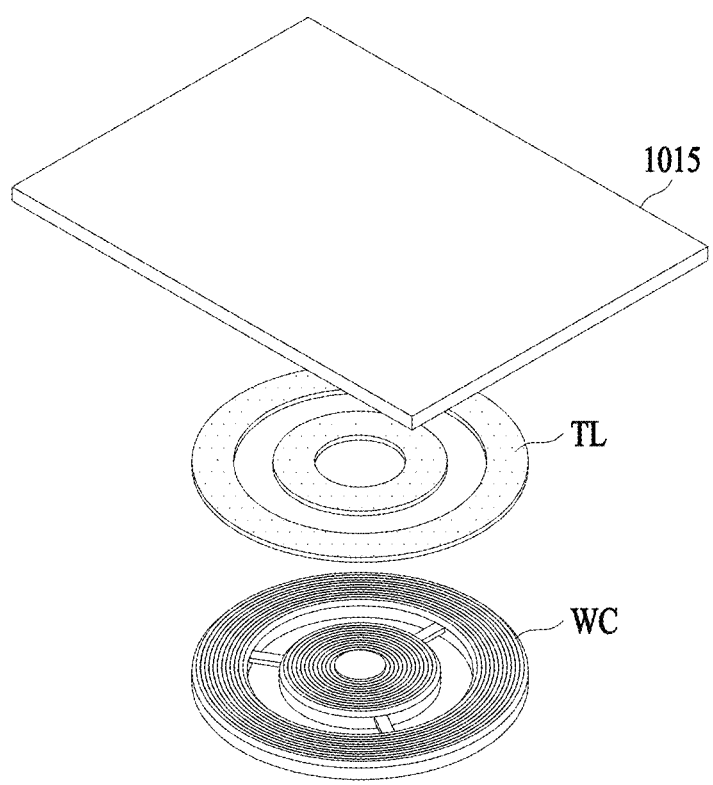

In some implementations, the overall shape of the thin film TL may correspond to the shape of the working coil WC for inductively heating the thin film TL. For example, when the working coil WC has a circular ring shape, the plurality of sub-films constituting the thin film TL may have a circular ring shape corresponding to the working coil WC. However, the shape of the thin film TL is not necessarily limited to the shape of the working coil WC. Therefore, only some of the plurality of sub-films may correspond to the shape of the working coil WC or may not correspond to the shape of the working coil WC FIG. 12 is a diagram illustrating elements provided in a case of an induction heating type cooktop having a thin film.

In some examples, the cooktop 1000 may be a thin film TL including a plurality of sub-films on the bottom of the upper plate 1015. In some implementations, the thin film TL disposed on the bottom of the upper plate 1015 may be coated on the bottom surface of the upper plate 1015, and the coating method may be any of various methods including vacuum deposition as described in FIG. 11. In addition to a layer including a material to be inductively heated, at least one additional layer to be disposed on the bottom of the upper plate 1015 may be further included.

Figure 13:
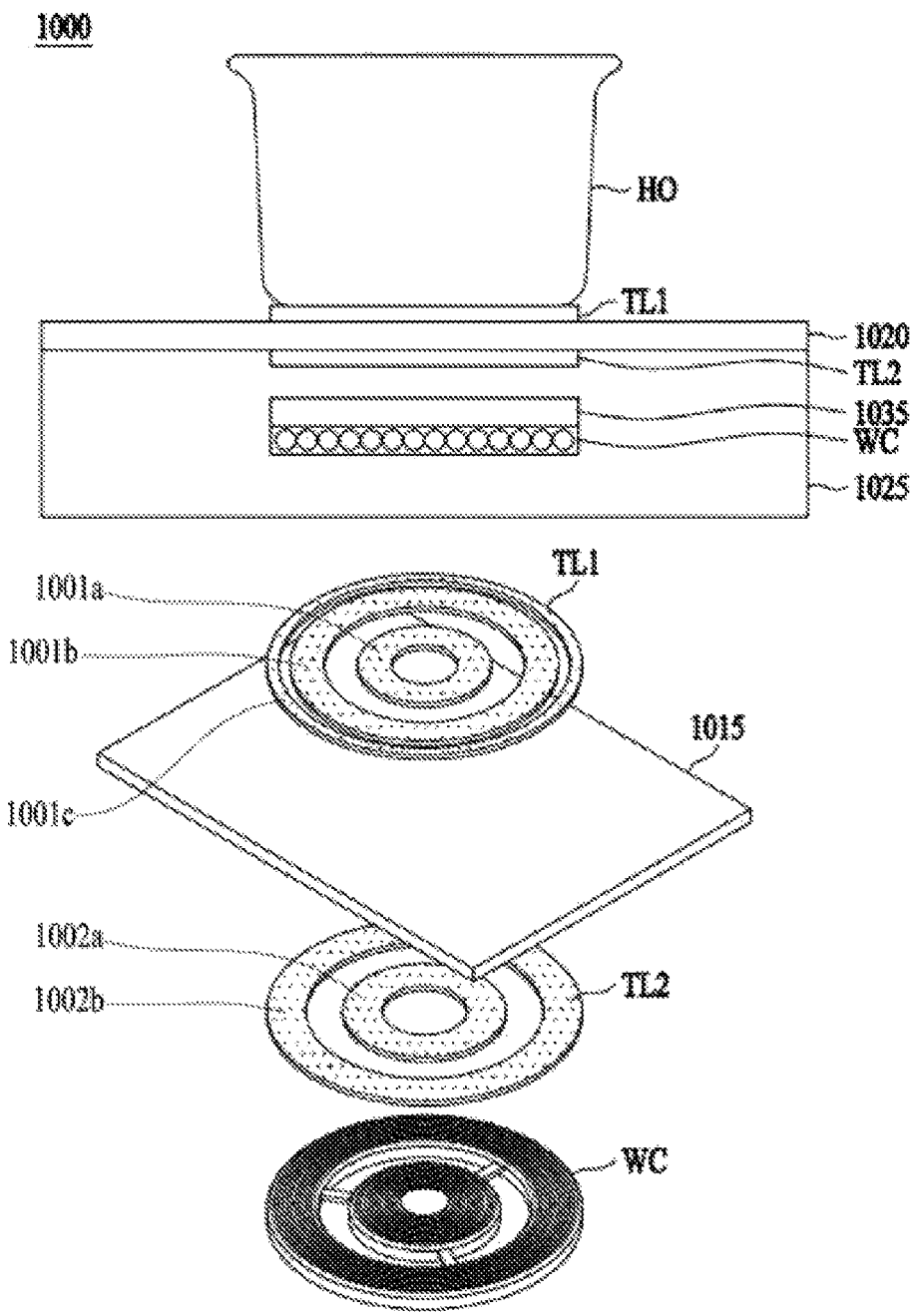
FIG. 13 is a diagram illustrating example elements disposed in an example case of an induction heating type cooktop having a thin film TL.

FIG. 13 is a diagram illustrating example elements provided in a case of an induction heating type cooktop having a thin film TL.

In some implementations, the cooktop 1000 may include thin films TL1 and TL2 including a plurality of sub-films on the top and the bottom of the upper plate 1015. In the aforementioned implementations related to FIGS. 2 and 4, the first and second thin films TL1 and TL2 may be inductively heated by the working coils WC1 and WC2, respectively. In the present implementation, the thin films TL1 and TL2 may be inductively heated by one working coil WC. For this purpose, the thin films TL1 and TL2 may be arranged in a vertical direction. In some implementations, the thin films TL1 and TL2 disposed on the top and the bottom of the upper plate 1015 may be coated on the bottom surface of the upper plate 1015, and the coating method may be any of various methods including vacuum deposition, as described with reference to FIGS. 11 and 12. In addition to a layer made of a material to be inductively heated, at least one additional layer (an adhesive layer or a protective layer) may be further included and disposed on the top and bottom of the upper plate 1015.

In some implementations, the thin films TL1 and TL2 disposed on the top and the bottom of the upper plate 1015 may be disposed on the upper plate 1015 in the same structure; the structures of the thin films TL1 and TL2 disposed on the top and the bottom of the upper plate 1015 may be different from each other. For example, the thin film TL1 disposed on the top of the upper plate 1015 may be protected by a protective layer, and the thin film TL2 disposed on the bottom of the upper plate 1015 may not be protected by the protective layer or by a layer different from the protective layer of the thin film TL disposed on the top of the upper plate 1015.

In some implementations, the plurality of sub-films constituting the thin films TL1 and TL2 disposed on the top and the bottom of the upper plate 1015 may have different shapes on the top and the bottom of the upper plate 1015. Referring to FIG. 13, the number of sub-films constituting the thin film TL1 disposed on the top of the upper plate 1015 may be different from the number of sub-films constituting the thin film TL2 disposed on the bottom of the upper plate 1015. According to an exemplary implementation, the number of sub-films constituting the thin film TL1 disposed on the top of the upper plate 1015 and the number of sub-films constituting the thin film TL2 disposed on the bottom of the upper plate 1015 may have the same shape. Specific forms (e.g., widths or gaps) for a sub-film may have will be described later with reference to various implementations. For example, the thin film TL1 may include sub-thin films 1001a, 1001b, and 1001c that are disposed on top of the upper plate 1015, where the sub thin film 1001a may define a first sub-thin film. In addition, the thin film TL2 may include sub-thin films 1002a and 1002b that are disposed on the bottom of the upper plate 1015, where the sub-thin film 1002a may define a second sub-thin film, and the sub-thin film 1002b may define a third sub-thin film. The first sub-thin film 1001a may be spaced apart from the second sub-thin film 1002a in a vertical direction and may overlap with the second sub-thin film 1002a along the vertical direction. In addition, the first sub-thin film 1001a may be spaced apart from the third sub-thin film 1002b in the vertical direction and may be disposed such that the first sub-thin film 1001a does not overlap with the third sub-thin film 1002b along the vertical direction. Alternatively or in addition, any of the sub-thin films 1001b and 1001c of the thin film TL1 on top of the upper plate 1015, other than the first sub-thin film 1001a, may define a third sub-thin film that is spaced apart from the first sub-thin film 1001a in a radial direction and does not overlap with the first sub-thin film 1001a along the vertical direction.

Figure 14:
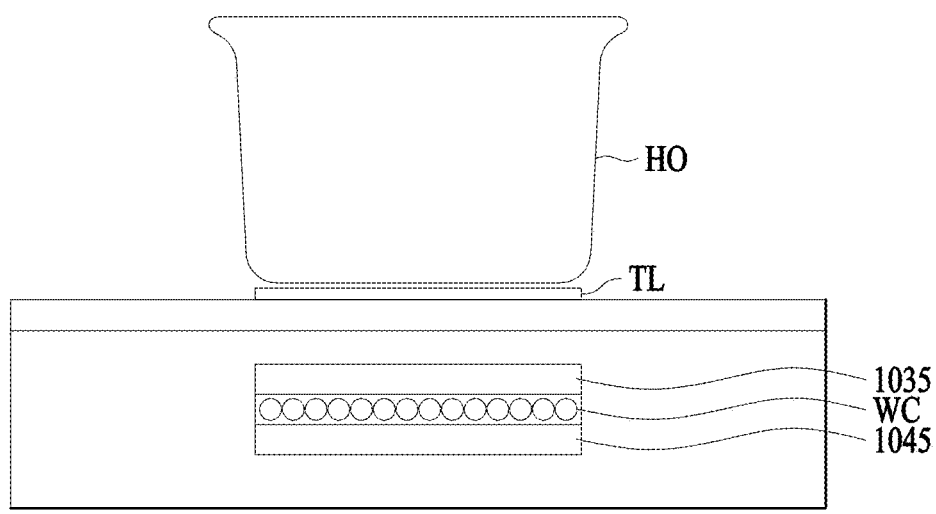
FIG. 14 illustrates an example of an equivalent circuit that includes a resistance component and an inductor component and that is defined through a thin film included in an induction heating type cooktop and a target heating object.
Figure 14:
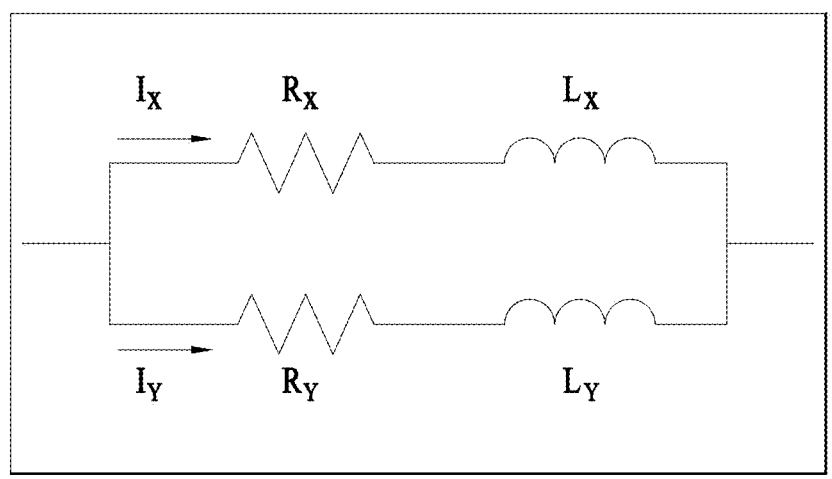

FIG. 14 illustrates an example of an equivalent circuit including a resistance component and an inductor component, where the circuit may be defined through a thin film included in an induction heating type cooktop and a target heating object.

The induction heating type cooktop 1000 using a thin film TL may form an equivalent circuit including a resistance component and an inductor component when a working coil WC operates in response to placement of a target heating object HO on the upper plate 1015. In doing so, at least one of the target heating object HO and the thin film TL may be inductively heated. For example, referring to FIG. 14, $R_X$ and $L_X$ may correspond to a resistance component and an inductor component associated with the target heating object HO, and $I_X$ may correspond to an induced current induced from the target heating object HO. In addition, $R_Y$ and $L_Y$ may correspond to a resistance component and an inductor component associated with the thin film TL, and $I_Y$ may correspond to an induced current induced from the thin film TL. However, $R_X$, $L_X$, $R_Y$ and $L_Y$ shown in FIG. 14 show an equivalent circuit formed by the physical configurations (that is, the target heating object HO and the thin film TL) when the working coil WC is operated. Thus, $R_X$, $L_X$, $R_Y$ and $L_Y$ may be understood as various types of a total resistance component and a total inductor component, and the like, and may be illustrated in other forms. Therefore, the correspondence between the resistance component, the inductor component, and the physical configuration described in the above implementation may be expressed in various forms that can be understood by a person skilled in the art in order to indicate a characteristic that an induced current flows in the target heating object HO. In some implementations, $R_Y$ and $L_Y$ illustrated in FIG. 14 may correspond to a total resistance component and a total inductor component of the plurality of sub-films constituting the thin film TL, in which case $I_Y$ may correspond to the total sum of the induced currents induced from the plurality of sub-films.

However, FIG. 14 is a diagram for explaining an induction heating process by an induction current of a thin film TL including a plurality of thin films, and thus, the corresponding characteristic should not be limited to the implementation illustrated in FIG. 14. That is, when the target heating object HO as a nonmagnetic object is disposed on the upper plate 1015, it may be understood that an equivalent circuit as shown in FIG. 7 is formed by a plurality of sub-films.

Figure 15:
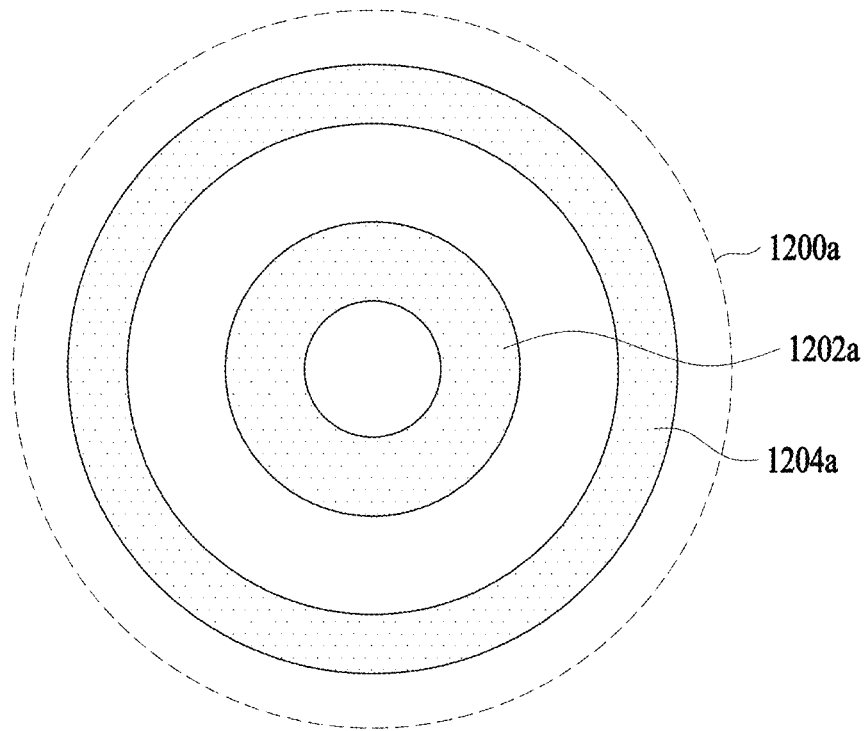
FIG. 15 illustrates an example of a thin film including a plurality of sub-films.
Figure 15:
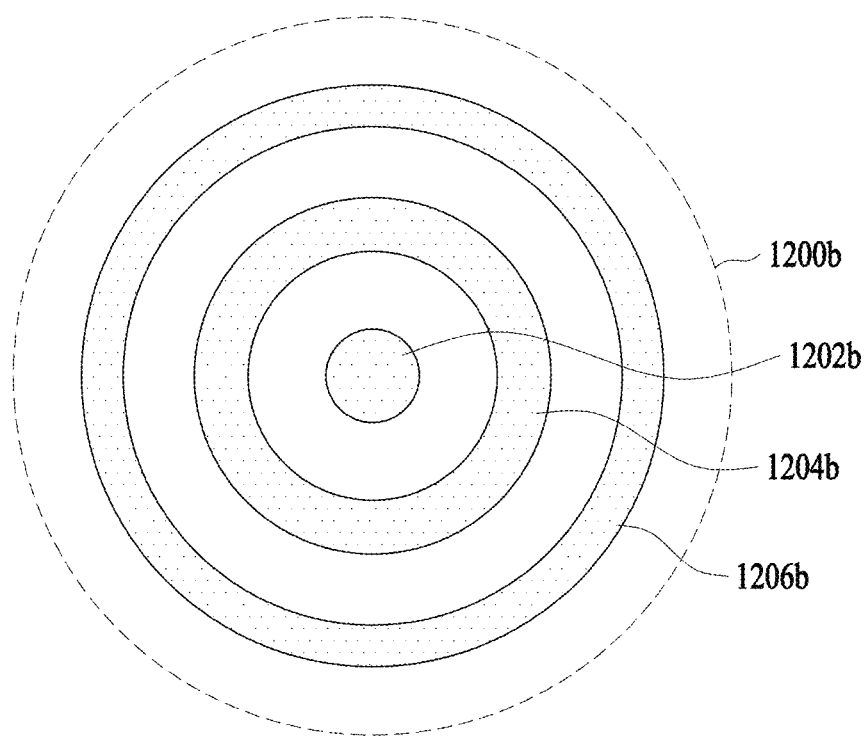

FIG. 15 illustrates an example of a thin film including a plurality of sub-films.

In some implementations, a thin film TL may include a plurality of sub-films capable of being inductively heated, and each sub-film may be spaced apart from each other. In some implementations, the sub-films may have a ring shape such that central portions of the sub-films overlap each other. Here, the central portions may be each defined as a center (e.g., a portion in which at least one of the horizontal length and the vertical length is half) of each of the sub-films having various polygonal shapes that can be understood by those skilled in the art. Referring to FIG. 15, sub-films 1202a, 1202b, 1204a, 1204b, and 1206b constituting thin films 1200a and 1200b are illustrated in a circular ring shape, in which case central portions of the sub-films 1202a, 1202b, 1204a, 1204b, 1206b may be understood as the center of the circular ring. However, the shapes of the sub-films 1202a, 1202b, 1204a, 1204b, and 1206b do not need to be limited to interpretation as shown in FIG. 15, and may be understood as various forms forming a loop with a predetermined area.

Referring to FIG. 15, the thin film 1200a may include two sub-films 1202a and 1204a having a ring shape, and the sub-films 1202a and 1204a may be spaced apart from each other. Since the sub-films 1202a and 1204a are in a ring shape with a central portion punctured, predetermined components (e.g., a temperature sensor such as a thermistor) included in the cooktop 1000 may be disposed. In addition, since a gap exists between the sub-films 1202a and 1204a, a temperature sensor such as a thermocouple may be disposed in the gap.

Referring to FIG. 15, the thin film 1200b may include a plurality of sub-films 1202b, 1204b, and 1206b, and the sub-film 1202b disposed in the center among these is in a ring shape with a central portion which is not punctured. That is, the thin film 1200b may include a plurality of the sub-film 1202b, 1204b, and 1206b, including the sub-film 1202b having a central portion not punctured. In some implementations, a gap exists between the sub-films 1202a and 1204a, and a temperature sensor such as a thermocouple may be disposed in the gap.

Figure 16A:
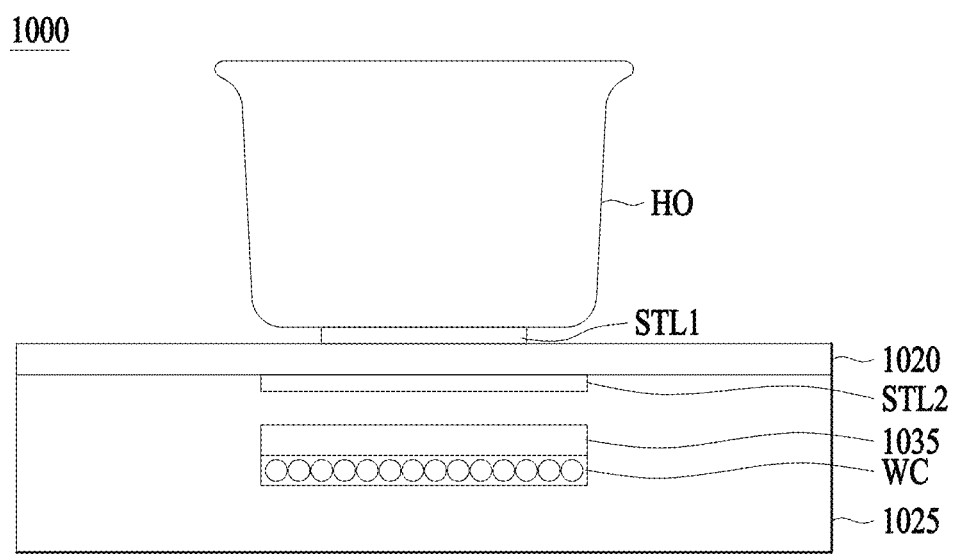
FIG. 16A illustrates an example of a thin film that includes a plurality of sub-films that are disposed on a top and a bottom of an upper plate of an induction heating type cooktop.
Figure 16A:
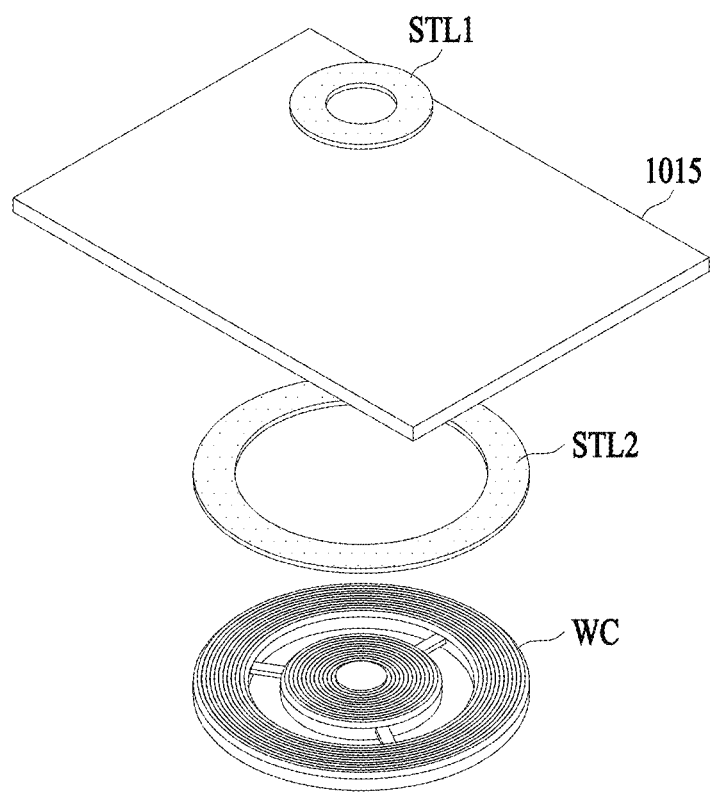

FIG. 16A illustrates an example a thin film including a plurality of sub-films that are disposed on a top and a bottom of an upper plate.

In some implementations, a thin film TL may include a plurality of sub-films STL1 and STL2 that may be inductively heated, and the thin film TL may be disposed on the top and bottom of the upper plate 1015. In some examples, where the thin film TL includes two sub-films STL1 and STL2, the sub-films STL1 and STL2 may be respectively disposed on the top and bottom of the upper plate 1015 to be inductively heated.

Figure 16B:
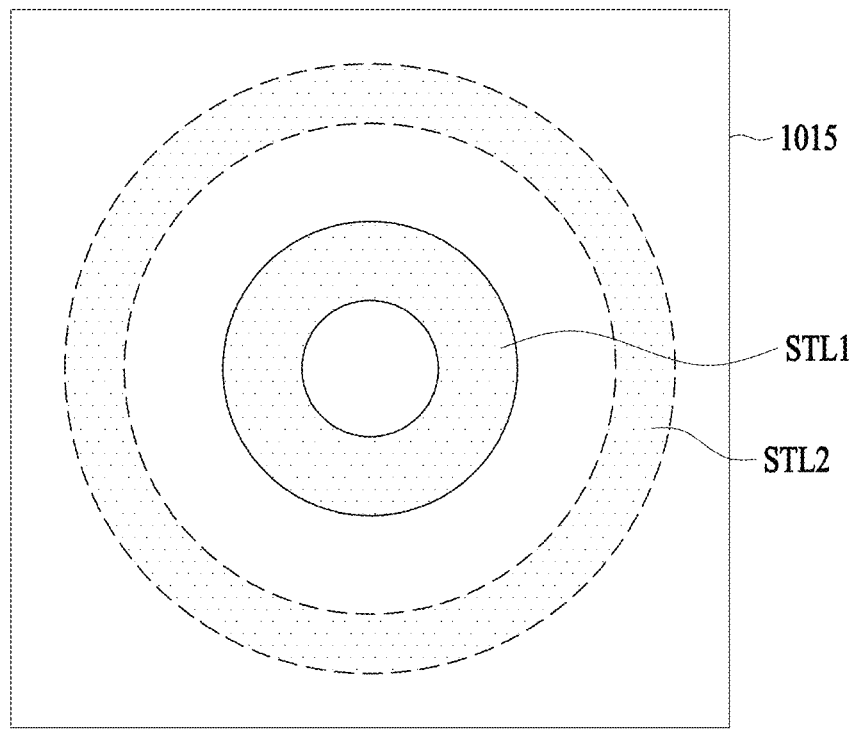
FIG. 16B is a plan view illustrating an example of the thin film including the plurality of sub-films in FIG. 16A.

FIG. 16B illustrates a plan view of the thin film including the plurality of sub-films of FIG. 16A. The plurality of sub-films may be disposed on the top and the bottom of the upper plate.

Referring to FIG. 16B, the sub-film STL2 outlined by a dotted line is disposed on the bottom of the upper plate 1015, and the sub-film STL1 outlined by a solid line is disposed on the top of the upper plate 1015. According to an exemplary implementation, the plurality of sub-films STL1 and STL2 disposed on the top and the bottom of the upper plate 1015 may be arranged so as not to overlap each other when viewed from above the upper plate 1015. That is, when viewed from above the upper plate 1015, the plurality of sub-films STL1 and STL2 may not overlap each other, so that gaps may exist between the respective sub-films.

Figure 17A:
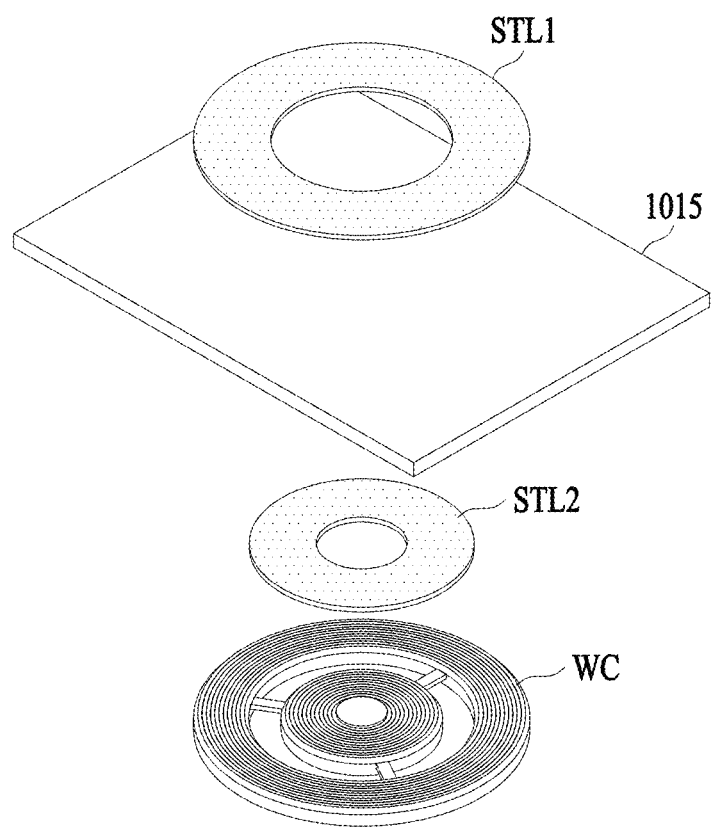
FIG. 17A illustrates an example a thin film including a plurality of sub-films that are disposed on a top and a bottom of an upper plate of an induction heating type cooktop.
Figure 17B:
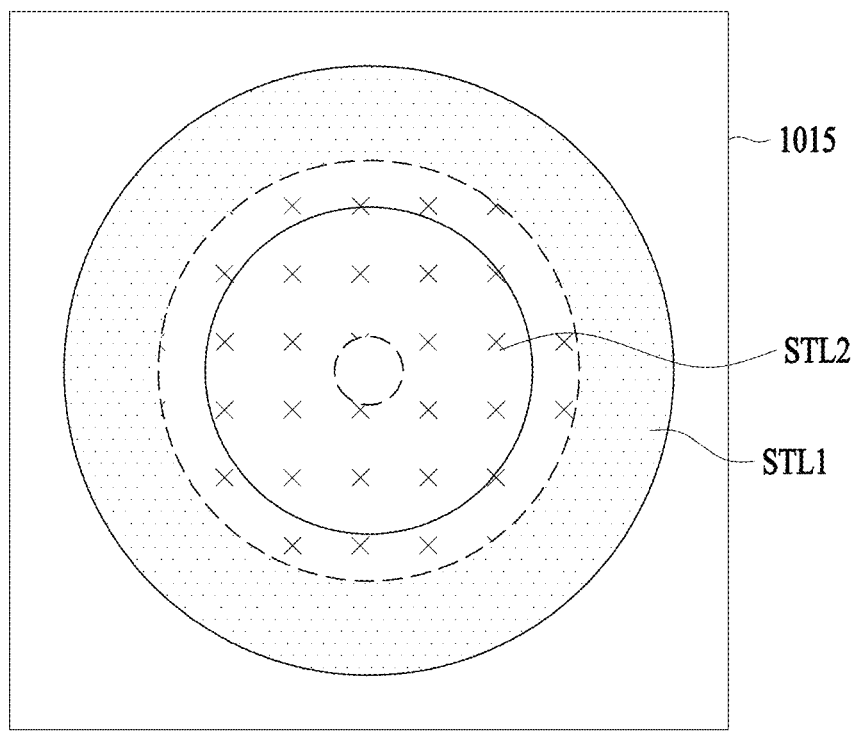
FIG. 17B is a plan view illustrating the thin film including the plurality of sub-films in FIG. 17A.

FIG. 17A illustrates an example of a thin film including a plurality of sub-films that are disposed on a top and a bottom of an upper plate, and FIG. 17B illustrates a plan view of the thin film including the plurality of sub-films of FIG. 17A. The plurality of sub-films may be disposed on the top and the bottom of the upper plate.

Referring to FIGS. 17A and 17B, in some implementations, a thin film TL may include a plurality of sub-films STL1 and STL2 capable of being inductively heated, and the thin film TL may be disposed on the top and the bottom of the upper plate 1015. According to an exemplary implementation, the sub-film STL2 outlined by a dotted line is disposed on the bottom of the upper plate 1015, and the sub-film STL1 outlined by a solid line is disposed on the top of the upper plate 1015. In some implementations, the plurality of sub-films STL1 and STL2 disposed on the upper and lower ends of the upper plate 1015 may overlap each other when viewed from above the upper plate 1015, unlike FIGS. 16A and 16B. That is, when viewed from above the upper plate 1015, the plurality of sub-films STL1 and STL2 may overlap each other, so that portions heated to a lower temperature than portions heated to the highest temperature overlap each other, thereby preventing temperature decrease in a gap between the sub-films STL1 and STL2 on the plan view. In some implementations, the sub-films STL1 and STL2 overlap each other on the plan view, but the sub-films STL1 and STL2 do not contact each other due to the upper plate 1015 and other components on a side view, and thus, the sub-films STL1 and STL2 have a gap to be spaced apart from each other.

FIGS. 16A, 16B, 17A, and 17B are views for explaining various arrangement methods of the thin film TL including the plurality of sub-films STL1 and STL2, and thus, the present disclosure need not be limited to the illustrated implementations. That is, the number of the plurality of sub-films STL1 and STL2 constituting the thin film TL may be two or more, and may be disposed at least one of the upper end and the lower end of the upper plate 1015. This arrangement may also be understood as a manner in which each of the sub-films STL1 and STL2 described through the above various implementations are spaced apart from each other In some implementations, the thin film TL may include a plurality of sub-films having a predetermined shape. In some implementations, the plurality of sub-films constituting the thin film TL may have at least one type of width. In some examples, a width in each of the plurality of sub-films may or may not be uniform.

In some implementations, a thickness of each of the plurality of sub-films STL1 and STL2 may be thinner than a skin depth of the plurality of sub-films STL1 and STL2.

In some implementations, when the plurality of sub-films STL1 and STL2 overlap, the sum of the thicknesses of the plurality of sub-films STL1 and STL2 in the overlapped portion may be thinner than the skin depth.

Figure 18:
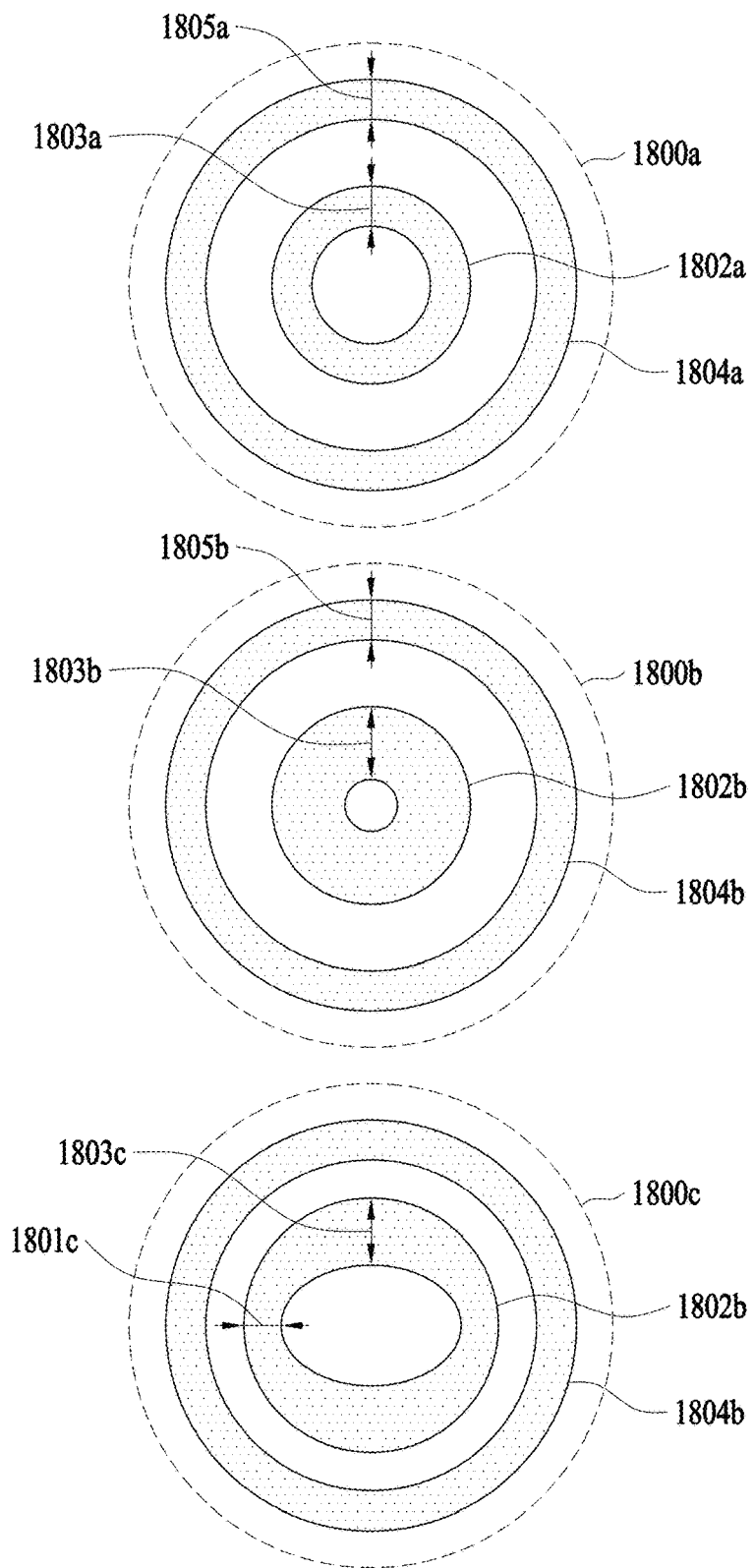
FIG. 18 illustrates examples of various types of a plurality of sub-films of a thin film of an induction heating type cooktop and example widths of the plurality of sub-films.

FIG. 18 illustrates various types of width allowed for a plurality of sub-films constituting a thin film.

Referring to FIG. 18, a thin film TL included in the induction heating type cooktop 1000 may include a thin film 1800a including sub-films 1802a and 1804a having a predetermined single width 1803a and 1805a, a thin film 1800b including sub-films 1802b and 1804b having a plurality of types of widths 1803b and 1805b, or a thin film 1800c including sub-films 1802c and 1804c having a non-uniform width 1801c and 1803c.

In some implementations, a criterion of whether the thin film TL to be used in the induction heating type cooktop 1000 has the predetermined single width 1803a and 1805a or the plurality of types of widths 1803b and 1805b may be based on a point which is inductively heated by each working coil WC. That is, it may be determined as to whether a sub-film inductively heated by each working coil WC has the predetermined single width 1803a and 1805a or the plurality of types of widths 1803b and 1805b.

In some examples, each of the sub-films 1802a and 1804a may have one or more widths defined along the upper plate.

In some implementations, whether the thin film TL has the predetermined single width 1803a or 1805a or the plurality of types of widths 1803b and 1805b may be determined for each of the top and the bottom of the upper plate 1015 of the induction heating type cooktop 1000. In some implementations, the plurality of sub-films may be disposed on at least one of the top and bottom of the upper plate 1015, and when the plurality of sub-films are disposed on the top or bottom portion of the upper plate 1015, the plurality of sub-films may have an upper portion. Alternatively, each of the lower ends may have a predetermined single width 1803a and 1805a or a plurality of types of widths 1803b and 1805b.

In some implementations, a plurality of sub-films may be disposed on both the top and the bottom of the upper plate 1015. In this case, the plurality of sub-films may have the predetermined single width 1803a and 1805a or the plurality of types of width 1803b and 1805b on both the top and the bottom of the upper plate 1015. For example, a plurality of sub-films disposed on the top of the upper plate 1015 may have a single width, and a plurality of sub-films disposed on the bottom of the upper plate 1015 may have a single width. In this case, a width of a plurality of sub-films may be different depending on whether the plurality of sub-films is disposed on the top or the bottom of the upper plate 1015.

In some implementations, at least one of the plurality of sub-films 1802c and 1804c constituting the thin film 1800c may have a non-uniform width. For example, one of the plurality of sub-films 1802c constituting the thin film 1800c may have a non-uniform width within a range from the first width 1801c to the second width 1803c.

Figure 19:
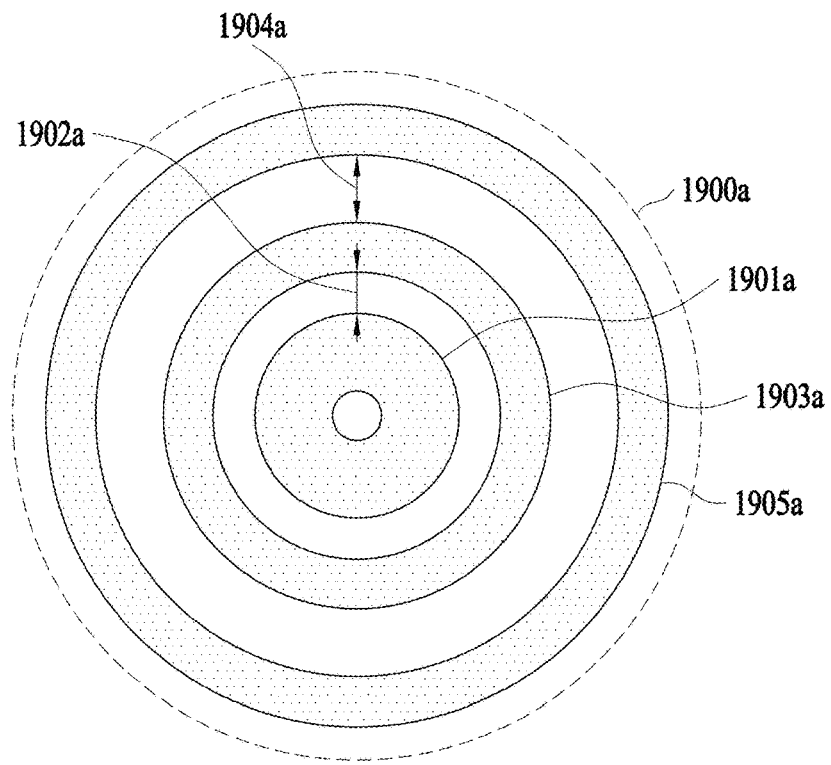
FIG. 19 illustrates examples of various types of a plurality of sub-films of a thin film of an induction heating type cooktop and example gaps between the plurality of sub-films.
Figure 19:
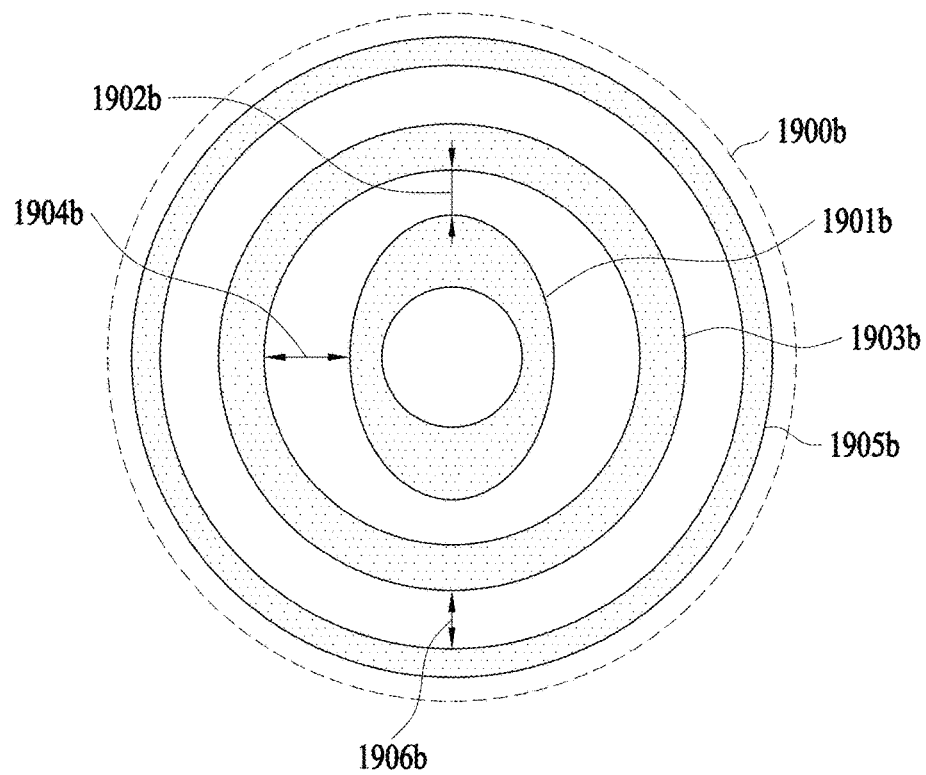

FIG. 19 illustrates examples of various types of a plurality of sub-films of a thin film and example gaps defined between the plurality of sub-films.

Referring to FIG. 19, a thin film 1900a may include a plurality of sub-films 1901a, 1903a, and 1905a, and the plurality of thin films 1901a, 1903a, and 1905a may be spaced apart with gaps 1902a and 1904a therebetween. In some implementations, the gaps 1902a and 1904a between the plurality of thin films 1901a, 1903a, and 1905a may be uniform and may have a plurality of distances.

In some implementations, a thin film 1900b may include a plurality of sub-films 1901b, 1903b, and 1905b. Among the plurality of sub-films 1901b, 1903b, and 1905b, some sub-films 1901b and 1903b may be spaced apart from each other with a gap that is non-uniform in a range from a first gap 1902b to the second gap 1904b. In some implementations, the thin film 1900b may be configured such that the sub-films 1901b and 1903b have a non-uniform gap while other sub-films 1903b and 1905b have a uniform gap (e.g., a gap 1906).

Figure 20:
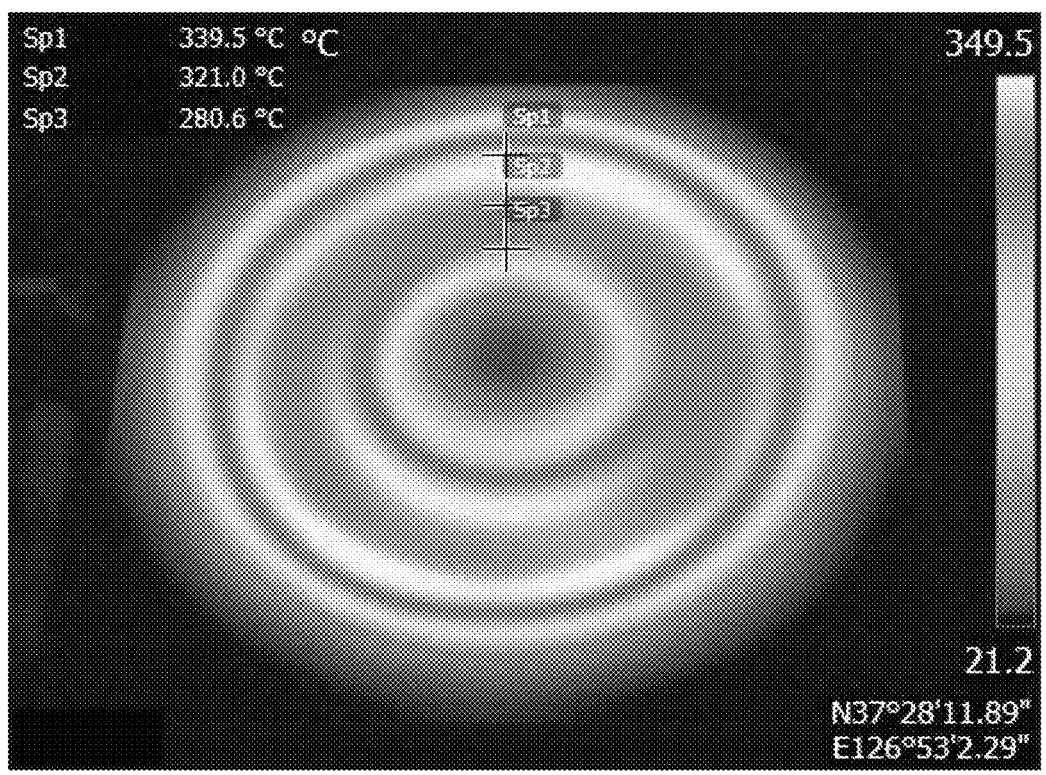
FIG. 20 illustrates an example of heat distribution across a thin film including a plurality of sub-films that are inductively heated.

FIG. 20 illustrates an example of heat distribution in a thin film including a plurality of sub-films that are inductively heated.

Specifically, as a thin film TL including a plurality of sub-films is inductively heated, the temperature at which the target heating object HO can be heated may be distributed uniformly at a high temperature at least in radial direction in a relatively wider range, as compared with the case of using a single thin film. Accordingly, it may be possible to efficiently and quickly heat the target heating object HO while minimizing thermal deformation and damage of the thin film TL.

In some implementations, it may be possible to heat both a magnetic object and a nonmagnetic object at a single induction fire hole by using a thin film capable of being directly inductively heated.

In some implementations, a thin film to be inductively heated includes a plurality of sub-films, thereby reducing a difference in heating temperature in a radial direction within each sub-film and accordingly preventing damage or thermal deformation of the thin film In some implementations, a thin film to be inductively heated includes a plurality of sub-films, thereby reducing a difference in heating temperature in a radial direction within each sub-film and accordingly preventing damage or thermal deformation of the thin film.

In addition to the aforementioned effects, other specific effects have been described above with reference to the foregoing implementations of the present disclosure.

The foregoing description of the present disclosure is not limited to the aforementioned implementations and the accompanying drawings, and it will be obvious to those skilled in the technical field to which the present disclosure pertains that various substitutions, modifications, and changes may be made within the scope without departing from the technical spirit of the present disclosure.

What is claimed is:

1. An induction heating cooktop, comprising:
a cover plate coupled to a top of a case, the cover plate comprising an upper plate configured to seat an object to be heated;
a working coil disposed inside the case and configured to heat the object; and
a thin film having a thickness that enables the thin film (i) to transmit a magnetic field generated by the working coil to the object and (ii) to be inductively heated by the working coil to thereby heat the object, the thin film comprising a plurality of sub-films that are arranged about a central portion of the thin film,
wherein an outer boundary of one of the plurality of sub-films is positioned on a radially different position from an outer boundary of another of the plurality of sub-films relative to the central portion of the thin film.

2. The induction heating cooktop of claim 1, wherein a thickness of each of the plurality of sub-films is less than a skin depth of the plurality of sub-films.

3. The induction heating cooktop of claim 1, wherein the thin film is coated on the at least one of a top surface of the upper plate and a bottom surface of the upper plate.

4. The induction heating cooktop of claim 1, wherein each of the plurality of sub-films defines a closed loop configured to carry an eddy current.

5. The induction heating cooktop of claim 1, wherein at least one of the plurality of sub-films has a ring shape.

6. The induction heating cooktop of claim 5, wherein the plurality of sub-films comprise a sub-film that is disposed at a center of the plurality of sub-films and that defines a hole in the central portion of the thin film.

7. The induction heating cooktop of claim 5, wherein the plurality of sub-films comprise a sub-film that is disposed at a center of the plurality of sub-films and that covers the central portion of the thin film.

8. The induction heating cooktop of claim 1, wherein a width of each of the plurality of sub-films is in a predetermined range.

9. The induction heating cooktop of claim 1, wherein each of the plurality of sub-films has a uniform width.

10. The induction heating cooktop of claim 1, wherein widths of the plurality of sub-films are different from each other.

11. The induction heating cooktop of claim 1, wherein each of the plurality of sub-films has a non-uniform width that is in a predetermined range.

12. The induction heating cooktop of claim 1, wherein each of the plurality of sub-films has an arc shape,
wherein the plurality of sub-films is symmetrically disposed about an axis passing through the central portion of the thin film, the axis extending in a radial direction of the thin film.

13. An induction heating cooktop, comprising:
a cover plate coupled to a top of a case, the cover plate comprising an upper plate configured to seat an object to be heated;
a working coil disposed inside the case and configured to heat the object; and
a thin film disposed on the upper plate and the thin film comprising a plurality of sub-films that are arranged about a central portion of the thin film,
wherein one of the plurality of sub-films is spaced apart from another of the plurality of sub-films to thereby define a gap therebetween, and
wherein the thin film is configured to define an equivalent circuit with the object to thereby enable the working coil to apply an eddy current to selectively one of the thin film or the object based on a material of the object.

14. The induction heating cooktop of claim 13, wherein the gap is defined in a vertical direction.

15. The induction heating cooktop of claim 13, wherein the gap is defined in a radial direction about the central portion of the thin film.

16. The induction heating cooktop of claim 13, wherein the gap includes:
a first gap defined in a first direction;
a second gap defined in a second direction intersecting the first direction.

17. The induction heating cooktop of claim 13, wherein the thin film is coated on the at least one of a top surface of the upper plate and a bottom surface of the upper plate.

18. The induction heating cooktop of claim 13, wherein each of the plurality of sub-films has an arc shape, and
wherein the plurality of sub-films is symmetrically disposed about an axis passing through the central portion of the thin film, the axis extending in a radial direction of the thin film.

19. The induction heating cooktop of claim 13, wherein each of the plurality of sub-films defines a closed loop.

20. An induction heating cooktop, comprising:
a cover plate coupled to a top of a case, the cover plate comprising an upper plate configured to seat an object to be heated;
a working coil disposed inside the case and configured to heat the object; and
a thin film disposed on the upper plate and the thin film comprising a plurality of sub-films that are arranged about a central portion of the thin film, at least one of the plurality of sub-films and the object being configured to define an equivalent circuit,
wherein one of the plurality of sub-films is spaced apart from another of the plurality of sub-films to thereby define a gap therebetween, and
wherein the plurality of sub-films comprise:
a first sub-film,
a second sub-film spaced apart from the first sub-film, wherein the first sub-film and the second sub-film are disposed to overlap with each other along a vertical direction, and
a third sub-film spaced apart from the first sub-film, wherein the first sub-film and the third sub-film are disposed not to overlap with each other along the vertical direction.

* * * * *